(12) United States Patent
Kim et al.

(10) Patent No.: US 8,744,528 B2
(45) Date of Patent: Jun. 3, 2014

(54) GESTURE-BASED CONTROL METHOD AND APPARATUS OF AN ELECTRONIC DEVICE

(75) Inventors: Yongsin Kim, Seoul (KR); Jeff Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 301 days.

(21) Appl. No.: 13/201,950

(22) PCT Filed: May 16, 2011

(86) PCT No.: PCT/KR2011/003589
§ 371 (c)(1),
(2), (4) Date: Aug. 17, 2011

(87) PCT Pub. No.: WO2012/157792
PCT Pub. Date: Nov. 22, 2012

(65) Prior Publication Data
US 2012/0295661 A1  Nov. 22, 2012

(51) Int. Cl.
*H04M 1/00* (2006.01)
*H04M 3/00* (2006.01)

(52) U.S. Cl.
USPC ........... 455/566; 455/418; 455/420; 455/41.1

(58) Field of Classification Search
USPC ...................................... 455/556.1
See application file for complete search history.

(56) References Cited

U.S. PATENT DOCUMENTS

| | | | | |
|---|---|---|---|---|
| 5,594,469 A | * | 1/1997 | Freeman et al. | 345/158 |
| 5,714,698 A | * | 2/1998 | Tokioka et al. | 73/865.4 |
| 5,732,227 A | * | 3/1998 | Kuzunuki et al. | 715/775 |
| 6,111,580 A | * | 8/2000 | Kazama et al. | 715/863 |
| 2002/0041327 A1 | | 4/2002 | Hildreth et al. | 348/42 |
| 2004/0046736 A1 | * | 3/2004 | Pryor et al. | 345/156 |
| 2005/0028006 A1 | | 2/2005 | Leser et al. | 713/200 |
| 2005/0057491 A1 | | 3/2005 | Zacks et al. | 345/156 |
| 2006/0013440 A1 | * | 1/2006 | Cohen et al. | 382/103 |
| 2006/0101019 A1 | | 5/2006 | Nelson et al. | 707/9 |
| 2008/0220809 A1 | | 9/2008 | Hansen | 455/550.1 |
| 2009/0099812 A1 | * | 4/2009 | Kahn et al. | 702/152 |
| 2009/0217210 A1 | | 8/2009 | Zheng et al. | 715/863 |
| 2011/0111798 A1 | * | 5/2011 | Jeon et al. | 455/556.1 |
| 2011/0275432 A1 | * | 11/2011 | Lutnick et al. | 463/25 |
| 2012/0262574 A1 | * | 10/2012 | Park et al. | 348/143 |
| 2013/0035086 A1 | * | 2/2013 | Chardon et al. | 455/420 |

FOREIGN PATENT DOCUMENTS

KR  10-2005-0013249 A  2/2005

OTHER PUBLICATIONS

International Search Report dated Jan. 2, 2012.

* cited by examiner

*Primary Examiner* — Erika A Washington
(74) *Attorney, Agent, or Firm* — Morgan, Lewis & Bockius LLP

(57) ABSTRACT

An electronic device is provided comprising a camera obtaining an image, and a controller that performs a control operation based on a gesture recognized from the obtained image, wherein the controller performs a predetermined function of an application being executed when a predetermined gesture of a user is recognized, wherein the user does not have a control right and the predetermined gesture corresponds to the predetermined function.

32 Claims, 40 Drawing Sheets

FIG. 5
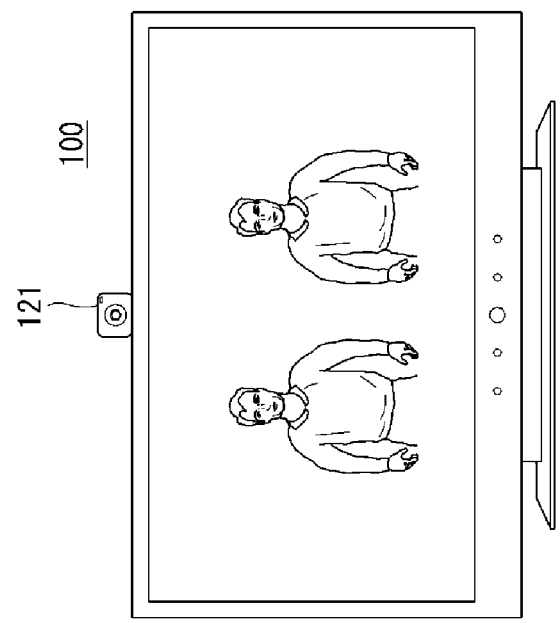
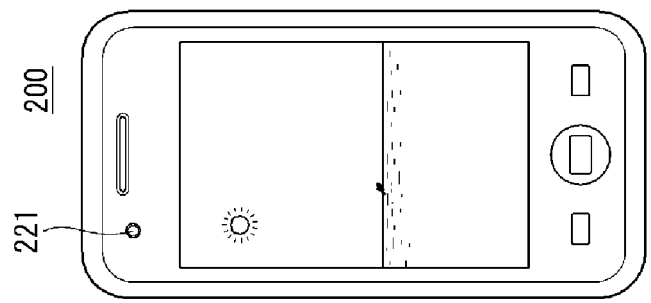

FIG. 10
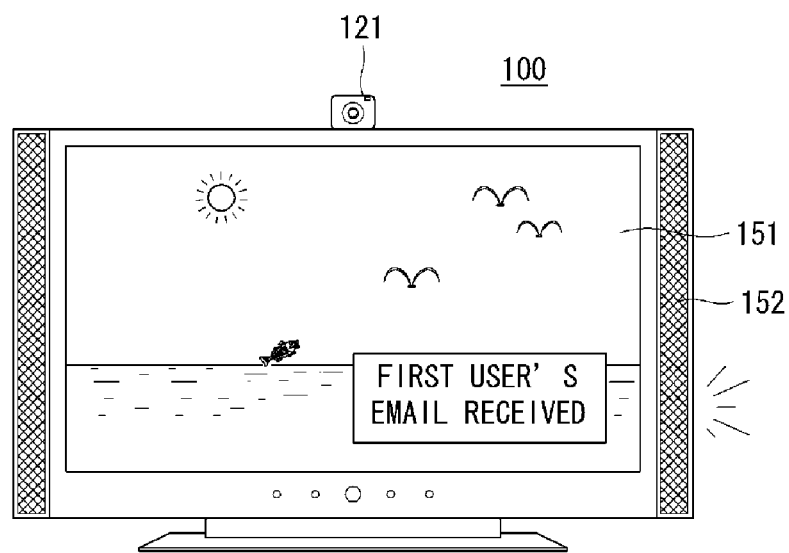
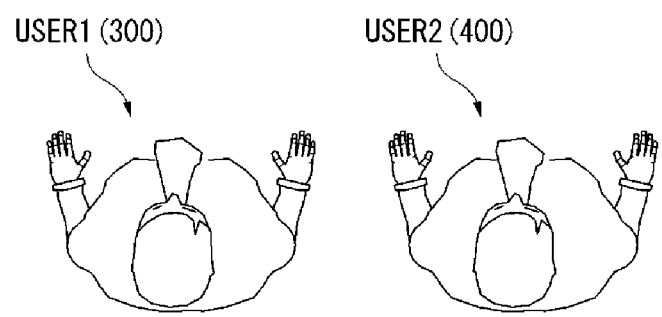

FIG. 12
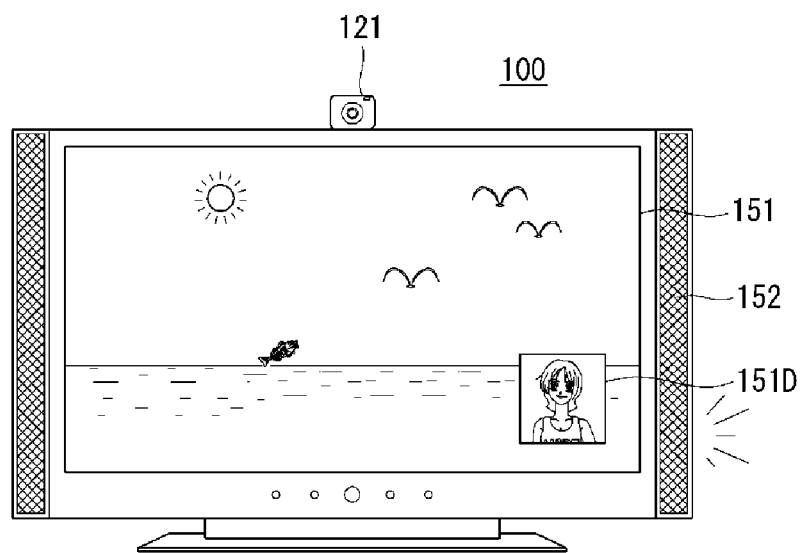
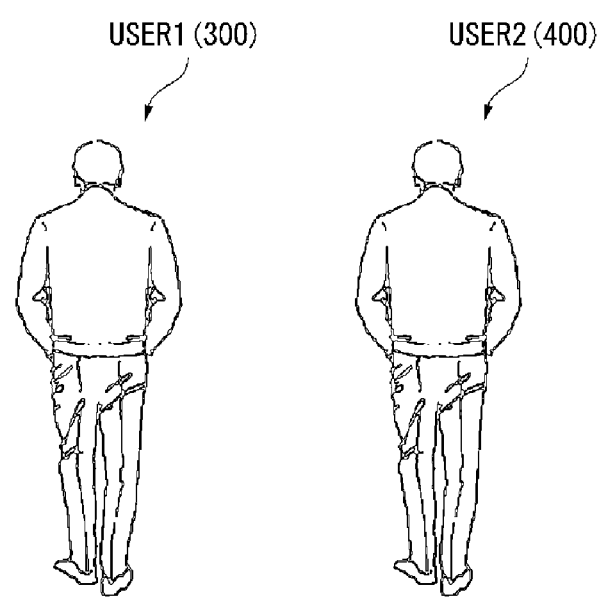

GESTURE-BASED CONTROL METHOD AND APPARATUS OF AN ELECTRONIC DEVICE

CROSS-REFERENCE TO RELATED APPLICATION(S)

This application is a National Stage entry of International Patent Application No. PCT/KR2011/003589, filed on May 16, 2011, the entire disclosure of which is incorporated herein by reference for all purposes.

BACKGROUND

1. Field

The following description relates to an electronic device, and more specifically to an electronic device that may be controlled through a gesture user interface.

2. Related Art

Diversified functions of terminals, such as personal computers, laptop computers, or mobile phones call for multimedia players with various functions including, for example, still or motion image obtaining, playback of music or movie files, game play, or broadcast receipt.

Such terminals may be classified into mobile terminals and stationary terminals according to mobility and may be classified into handheld terminals and vehicle mount terminals according to portability.

To enforce and add terminal functions, it may be considered to improve structures and/or software of terminals.

SUMMARY

An embodiment provides a gesture-controllable electronic device that allows a user with no control right for the electronic device to perform a predetermined function of an application being executed by taking a predetermined gesture.

An embodiment provides a gesture-controllable electronic device that may control a control right retaining time using a gesture according to an operational state.

An embodiment provides a gesture-controllable electronic device that may grant at least one user a control right for a plurality of electronic devices.

An embodiment provides a gesture-controllable electronic device that may maintain, take back, or assign a control right based on whether a user who has the control right is recognized through a camera.

An embodiment provides a gesture-controllable electronic device that may change operational modes based on whether a user who has a control right is recognized through camera.

The embodiments are not limited thereto, and other embodiments may also be apparent to those of ordinary skill in the art from the description taken in conjunction with the accompanying drawings.

According to an embodiment, there is provided an electronic device comprising a camera obtaining an image, and a controller that performs a control operation based on a gesture recognized from the obtained image, wherein the controller performs a predetermined function of an application being executed when a predetermined gesture of a user is recognized, wherein the user does not have a control right and the predetermined gesture corresponds to the predetermined function.

According to an embodiment, there is provided an electronic device, comprising a camera configured to obtain an image, and a controller configured to: grant a user a control right based on a gesture recognized from the obtained image, and deprive the user of the control right if the user's control gesture is not recognized for a predetermined time, the controller further configured to differently set the predetermined time based on a type of an application.

According to an embodiment, there is provided an electronic device forming a network along with a another electronic device, the electronic device comprising a camera configured to obtain an image, and a controller configured to grant a user a control right for the electronic device and the another electronic device such that the user controls the electronic device and the another electronic device, based on a gesture recognized from the obtained image.

According to an embodiment, there is provided an electronic device, comprising a camera configured to obtain an image, and a controller configured to: grant a user a control right for the electronic device such that the user controls the electronic device, based on a gesture recognized from the obtained image, and deprive the user of the control right if the user departs from a recognition range of the camera, the controller maintaining the control right granted to the user for at least a predetermined time after the user departs from the recognition range of the camera.

According to an embodiment, there is provided an electronic device, comprising a camera configured to obtain an image, and a controller configured to: perform a control operation based on a control granting gesture recognized from the obtained image, perform a predetermined function of an application being executed when a predetermined gesture of a user is recognized, the user not having a control right, the predetermined gesture corresponding to the predetermined function, the predetermined gesture being different from the control granting gesture.

According to the embodiments, the electronic device allows a user with no control right for the electronic device to perform a predetermined function of an application being executed by taking a predetermined gesture, may control a control right retaining time using a gesture according to an operational state, may grant at least one user a control right for a plurality of electronic devices, may maintain, take back, or assign a control right based on whether a user who has the control right is recognized through a camera, and may change operational modes based on whether a user who has a control right is recognized through camera.

BRIEF DESCRIPTION OF THE DRAWINGS

The embodiments will be described in detail with reference to the following drawings in which like numerals refer to like elements.

FIG. 5 illustrates an example where an electronic device according to an embodiment interworks with another electronic device through a wireless network.

FIGS. 10 and 11 illustrate examples of performing the method of controlling an electronic device as described in connection with FIG. 9 when an email receipt interrupt is received.

FIGS. 12 and 13 illustrate examples of performing the method of controlling an electronic device as described in connection with FIG. 9 when a visit notification interrupt is received from a device opening/closing a door.

DETAILED DESCRIPTION

Hereinafter, example embodiments will be described in detail with reference to the accompanying drawings.

The invention will now be described more fully with reference to the accompanying drawings, in which example embodiments are shown. The invention may, however, be embodied in many different forms and should not be construed as being limited to the embodiments set forth herein; rather, embodiments are provided so that this disclosure will be thorough and complete, and will fully convey the concept of the present invention to those skilled in the art.

Hereinafter, an electronic device relating to the present invention will be described below in more detail with reference to the accompanying drawings. In the following description, suffixes "module" and "unit" are given to components of the mobile terminal in consideration of only facilitation of description and do not have meanings or functions discriminated from each other.

The electronic device described in the specification may be mobile terminal such as a cellular phone, a smart phone, a laptop computer, a digital broadcasting terminal, personal digital assistants (PDA), a portable multimedia player (PMP), a navigation system and so on. Also, the electronic device may be stationary device such as a television, a personal computer, and so on.

Figure 1:
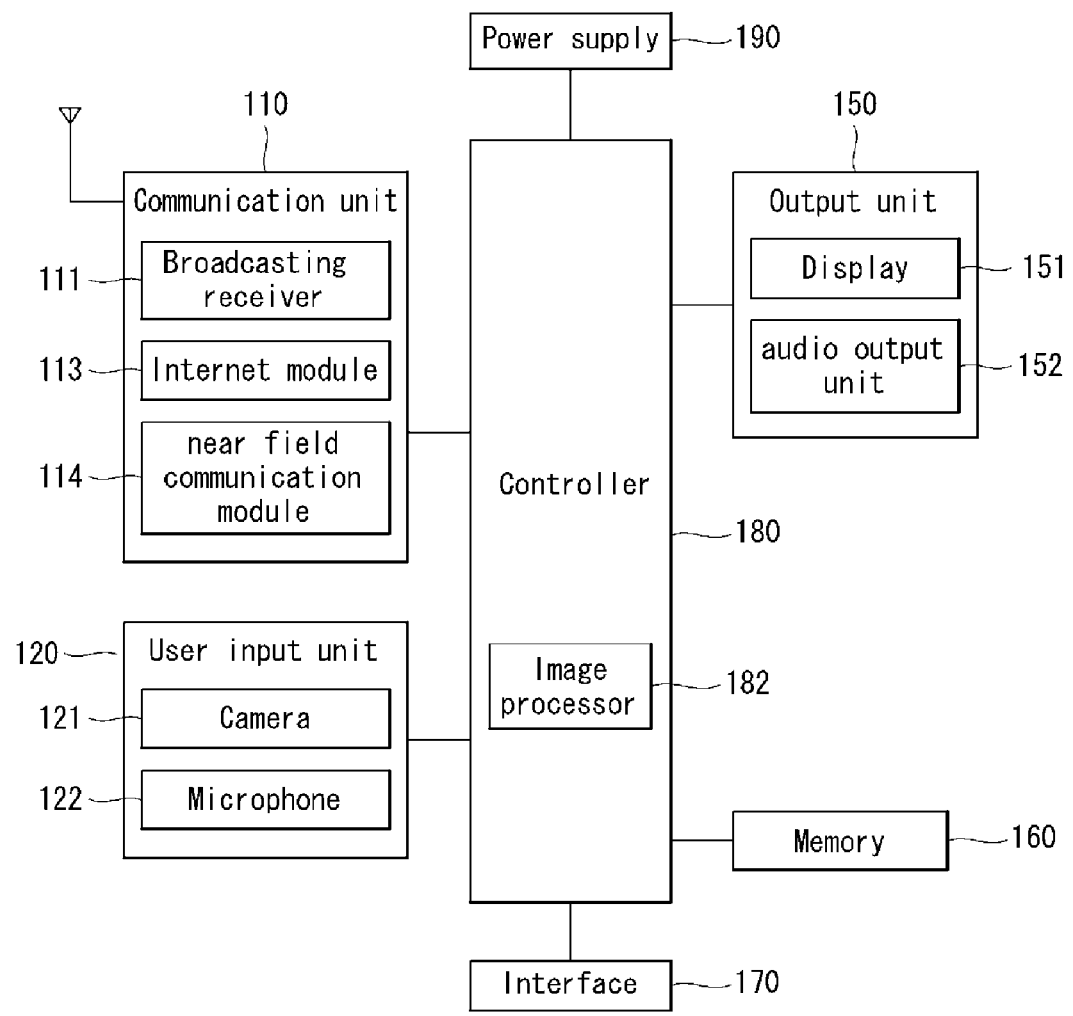
FIG. 1 is a block diagram of a display device relating to an embodiment.

FIG. 1 is a block diagram of a display device relating to an embodiment.

As shown, the display device 100 may include a communication unit 110, a user input unit 120, an output unit 150, a memory 160, an interface 170, a controller 180, and a power supply 190. Not all of the components shown in FIG. 1 may be essential parts and the number of components included in the display device 100 may be varied.

The communication unit 110 may include at least one module that enables communication between the display device 100 and a communication system or between the display device 100 and another device. For example, the communication unit 110 may include a broadcasting receiving module 111, an Internet module 113, and a near field communication module 114.

The broadcasting receiving module 111 may receive broadcasting signals and/or broadcasting related information from an external broadcasting management server through a broadcasting channel.

The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals, and data broadcasting signals but also signals in the form of a combination of a TV broadcasting signal and a radio broadcasting signal of a data broadcasting signal.

The broadcasting related information may be information on a broadcasting channel, a broadcasting program or a broadcasting service provider, and may be provided even through a communication network.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. The broadcasting signals and/or broadcasting related information received through the broadcasting receiving module 111 may be stored in the memory 160.

The Internet module 113 may correspond to a module for Internet access and may be included in the display device 100 or may be externally attached to the display device 100.

The near field communication module 114 may correspond to a module for near field communication. Further, Bluetooth®, radio frequency identification (RFID), infrared data association (IrDA), ultra wideband (UWB) and/or ZigBee® may be used as examples of a near field communication technique.

The user input 120 is used to input an audio signal or a video signal and may include a camera 121 and a microphone 122.

The camera 121 may process image frames of still images or moving images obtained by an image sensor in a video telephony mode or a photographing mode. The processed image frames may be displayed on a display 151. The camera 121 may be a two-dimensional (2D) or three-dimensional (3D) camera. In addition, the camera 121 may be configured in the form of a single 2D or 3D camera or in the form of a combination of the 2D and 3D cameras.

The image frames processed by the camera 121 may be stored in the memory 160 or may be transmitted to an external device through the communication unit 110. The display device 100 may include at least two cameras 121.

The microphone 122 may receive an external audio signal in a call mode, a recording mode or a speech recognition mode and process the received audio signal into electric audio data. The microphone 122 may employ various noise removal algorithms for removing or reducing noise generated when the external audio signal is received.

The output unit 150 may include the display 151 and an audio output module 152.

The display 151 may display information processed by the display device 100. The display 151 may display a user interface (UI) or a graphic user interface (GUI) relating to the display device 100. In addition, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display. The transparent display may include a transparent liquid crystal display. The rear structure of the display 151 may also be of a light transmissive type. Accordingly, a user may see an object located behind the body of terminal through the transparent area of the terminal body, occupied by the display 151.

The display device 100 may include at least two displays 151. For example, the display device 100 may include a plurality of displays 151 that are arranged on a single face at a predetermined distance or integrated displays. The plurality of displays 151 may also be arranged on different sides.

Further, when the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 can detect a touched portion of the display 151.

The audio output module 152 may output audio data received from the radio communication unit 110 or stored in the memory 160. The audio output module 152 may output audio signals related to functions, such as a call signal incoming tone and a message incoming tone, performed in the display device 100.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The display device 100 may also operate in relation to a web storage performing the storing function of the memory 160 on the Internet.

The interface 170 may serve as a path to all external devices connected to the mobile terminal 100. The interface 170 may receive data from the external devices or power and transmit the data or power to internal components of the display device terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The controller 180 may control overall operations of the mobile terminal 100. For example, the controller 180 may perform control and processing for voice communication. The controller 180 may also include an image processor 182 for pressing image, which will be explained later.

The power supply 190 receives external power and internal power and provides power required for each of the components of the display device 100 to operate under the control of the controller 180.

Various embodiments described in the present invention can be implemented in software, hardware or a computer readable recording medium. According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180 in some cases.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Figure 2:
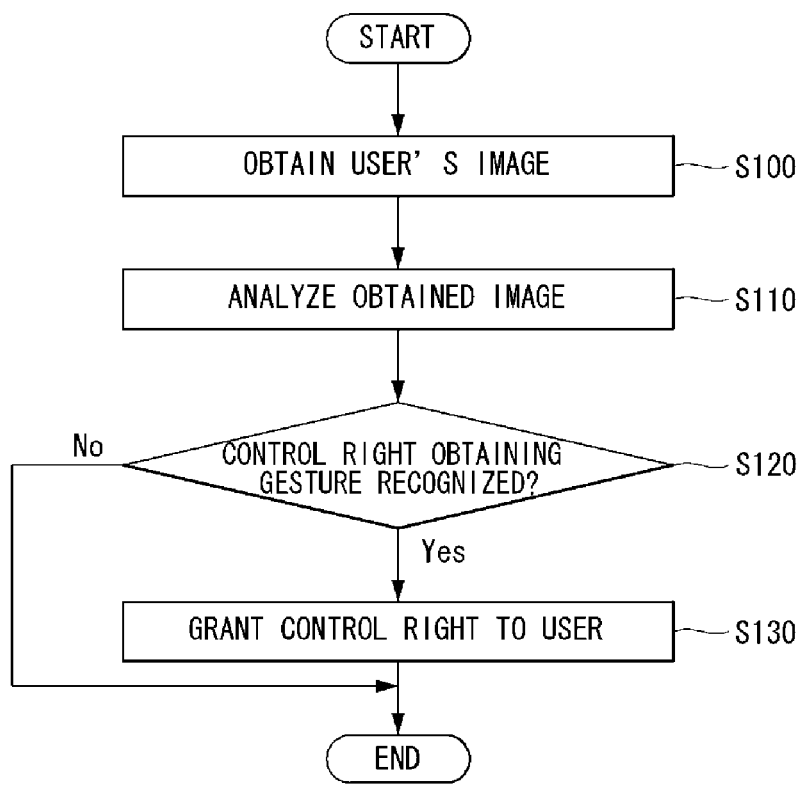
FIG. 2 is a flowchart illustrating a method of providing a control right of an electronic device according to an embodiment.

FIG. 2 is a flowchart illustrating a method of providing a control right of an electronic device according to an embodiment. Referring to FIGS. 1 and 2, a method of providing a control right will now be described.

First, the controller 180 of the electronic device 100 obtains a user's image (S100). Then, the controller 180 analyzes the obtained user's image (S110). Specifically, the image processor 182 of the controller 180 analyzes the obtained image to trace the location of each body part of a user.

For example, the controller 180 may recognize a user's body part by sensing the user's skin tone to trace the location of the body part. In general, human face and hands expose the skin tone as is. The human face has a left and right symmetrical shape. Two eyes of a human being generally have a relatively dark color.

As such, a user's face may be sensed based on the characteristic color patterns. An object that moves relatively freely within a certain radius of the face and has a smaller size than the face may be treated as a hand. A hand may be treated to have a lower skin tone when the user makes a first than when the user opens the hand. In the case that skin tone portions and non-skin tone portions are alternately included in an object recognized as a hand, it may be considered as the user opening the hand.

The image analyzing method of recognizing a user's body part and tracing the location of the body part by sensing the user's skin tone is merely an example of image analyzing methods carried out by the image processor 182. Accordingly, the embodiments are not limited thereto. Various image analyzing methods may be performed by the image processor 182.

For example, the controller 180 may trace trajectories of objects included in the obtained image and may analyze whether the trajectories correspond to a predetermined trajectory. For example, when the user is included in the obtained image, the controller 180 may recognize the user's predetermined gesture by tracing the location of the user's body part.

The camera 121 may be integrally provided with the electronic device 100 to obtain an external object or may be provided separately from the electronic device 100 to transmit a obtained image of the object to the electronic device 100. According to an embodiment, the camera 121 may be a 2D camera, a 3D camera, or a combination of a 2D camera and a 3D camera. Although one camera 121 is shown in each of the drawings for convenience of description, a plurality of cameras 121 may be provided according to embodiments.

The controller 180 may analyze a 2D image obtained by a 2D camera faster than depth data (hereinafter, also referred to as "3D data") obtained by a 3D camera. The results of analysis of the 2D image may be affected a lot by surrounding illuminations. Moreover, it may be difficult to recognize the color of the 2D image when light sources are changed, and shades may be determined to originate from the same object.

The above-listed shortcomings of the image obtained by the 2D camera may be overcome when a 3D image obtained by the 3D camera is analyzed. However, the analysis of the 3D image may increase data throughput, thus reducing data processing rate.

The 3D camera may include, but not limited to, a stereoscopic camera, a structural light camera, a TOF (Time of Flight) camera, or the like.

The stereo camera may obtain a stereoscopic image using two obtaining lenses that are spaced apart from each other by a predetermined distance. The two lenses interoperate with each other in terms of focuses and exposure. The stereo camera allows an object to be viewed in 3D due to parallax between the two lenses. The structural light camera may obtain depth information of an object by analyzing a scattering pattern of reflected infrared rays.

The TOF camera may obtain a stereoscopic image by measuring a time that it would take a light beam radiated to an object to return. For example, as the object is far away, a travelling time of the light beam increases. Accordingly, the distance to the object may be calculated by measuring the travelling time of the light beam, and a combination of measured distances may result in a stereoscopic image being obtained. The TOF camera may also include an illumination device to radiate light beams to the object.

According to an embodiment, the electronic device 100 may analyze a 2D image obtained by the 2D camera to increase an image analysis speed, and may analyze a 3D image obtained by the 3D camera to enhance accuracy of image analysis. According to an embodiment, a 2D image analysis and a 3D image analysis may be together carried out.

If an analysis result of the obtained image shows a predetermined control right obtaining gesture is recognized (S120), the controller 180 provides the user with a control right using a gesture for the electronic device 100 (S130). As used herein, the "control right" refers to a control right using a gesture unless stated otherwise.

Then, the controller 180 analyzes the image obtained by the camera 121 to recognize the user's gesture, and controls an operation of the electronic device 100 based on the recognized gesture. This means that the controller 180 recognizes the user's control right obtaining gesture to activate a gesture user interface.

According to an embodiment, the controller 180 may provide a control right to a predetermined body part of the user. The user's body part may be at least one of the user's body parts, such as, for example, an arm, a leg, a hand, a foot, or a finger. When a control right is granted to the user's both hands, a both-hands (two-handed) gesture user interface is activated for the electronic device 100.

For example, if the electronic device 100 is a display apparatus, the user may perform various functions on the display apparatus, such as, for example, volume adjustment, channel adjustment, zoom in, zoom out, or brightness adjustment, by taking a predetermined gesture using the control right-granted hands.

As the gesture user interface using the user's predetermined body part is activated, the user may manipulate the electronic device 100 with a gesture. Accordingly, the user need not come close to the electronic device 100 for manipulation of buttons or remote controller. Thus, the user may conveniently use the electronic device 100.

Figure 3:
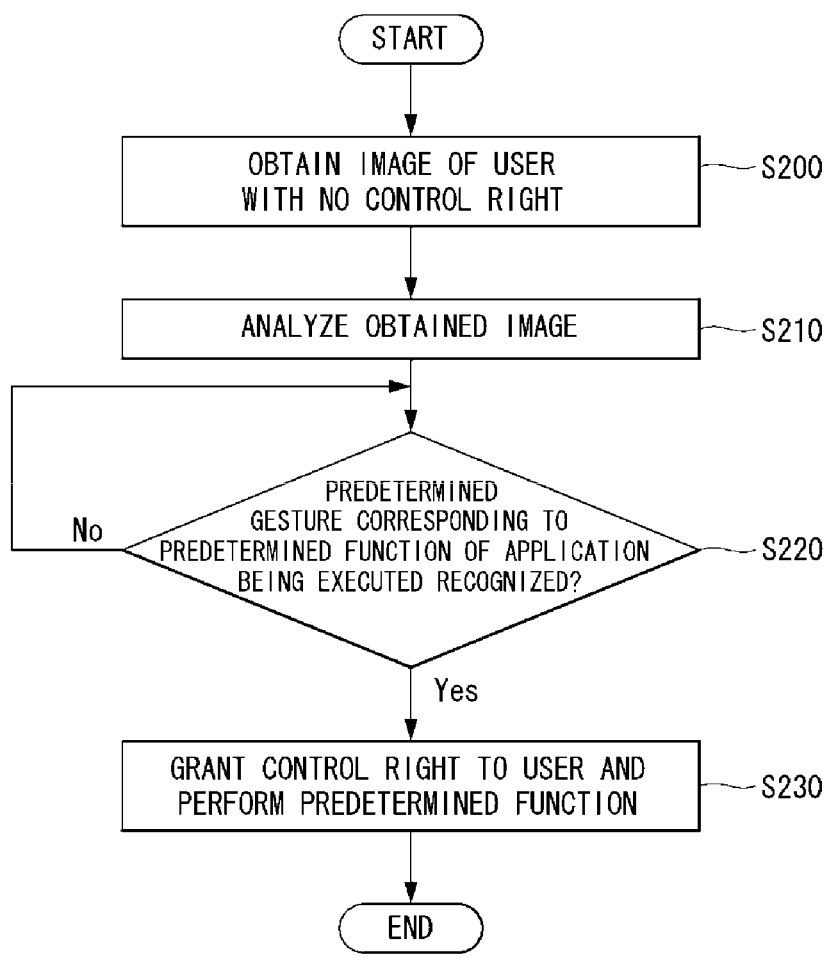
FIG. 3 is a flowchart illustrating a method of controlling an electronic device according to an embodiment.

FIG. 3 is a flowchart illustrating a method of controlling an electronic device according to an embodiment.

First, the controller 180 of the electronic device 100 obtains an image of a user that does not possess a control right using a gesture for the electronic device through the camera (S200). As used herein, the "user that does not possess a control right for the electronic device" may refer to not only a user who merely does not hold a control right but also a user who owns but has a usage constraint on a control right for the electronic device 100 or a user who previously owned but now lost a control right.

When the user's image is obtained, the controller 180 analyzes the obtained user's image (S210) and determines whether a gesture is recognized that corresponds to a predetermined function of an application being executed in the electronic device 100 (S220).

Upon recognition of the predetermined gesture corresponding to the predetermined function of the application being executed, the controller 180 grants the user a control right for the electronic device 100 and performs the predetermined function (S230). Although not shown in FIG. 3, when recognizing the predetermined gesture, the controller 180 may skip the step of granting the control right to the user and may immediately perform the predetermined function.

According to an embodiment, the predetermined gesture may be a control gesture for performing the predetermined function as well as a gesture for obtaining a control right for the electronic device 100.

A range of the control right granted to the user when the predetermined gesture is recognized according to the method of controlling an electronic device described in connection with FIG. 3 may be variously determined based on the setting. For example, upon recognition of the predetermined gesture, the controller 180 may grant the user a control right for the overall electronic device 100. Then, the user may control all the functions of the electronic device 100 as well as the application in execution.

According to embodiments, when recognizing the predetermined gesture, the controller 180 may grant the user only a control right for a currently executing predetermined application or may grant the user only a control right for a predetermined function for the application being executed.

Further, according to embodiments, once the user's predetermined gesture is recognized, the controller 180 may also grant the control right for the electronic device 100, the control right for the application being executed, or the control right for the predetermined function of the application being executed to any other user. Hereinafter, various example applications will be employed to describe the method of controlling an electronic device described in connection with FIG. 3.

Figure 4:
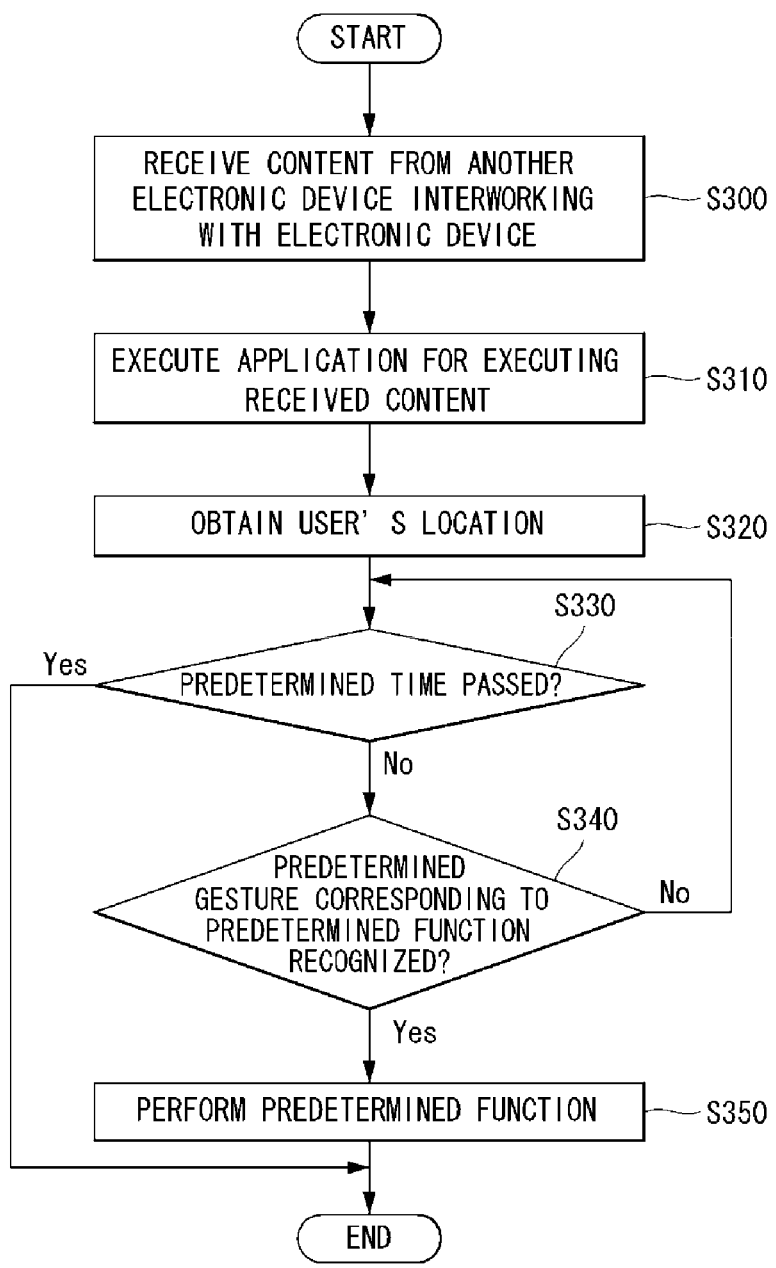
FIG. 4 is a flowchart illustrating a method of controlling an electronic device according to an embodiment.

FIG. 4 is a flowchart illustrating a method of controlling an electronic device according to an embodiment. Specifically, FIG. 4 illustrates an example of granting a control right to a user of any other electronic device interworking with the electronic device 100 without the operation of obtaining a control right for the electronic device 100. Hereinafter, the method of controlling an electronic device will be described with reference to FIGS. 1, 4, 5 to 8.

First, the electronic device 100 receives content from another electronic device 200 interworking with the electronic device 100 (S300). The electronic device 100 and the electronic device 200 may form a network using a near-field wireless communication technology. Then, the electronic device 100 executes an application for controlling the received content (S310). The steps S300 and S310 will now be described in detail with reference to FIGS. 5 and 6.

FIG. 5 illustrates an example where the electronic device 100 interworks with the electronic device 200 through a wireless network. Specifically, FIG. 5 illustrates that the electronic device 100 forms an N-screen in operable association with the electronic device 200.

Referring to FIG. 5, the electronic device 200 is a mobile device, such as a smart phone, and the electronic device 100 is a stationary device, such as a smart TV. However, the embodiments are not limited thereto.

Figure 6:
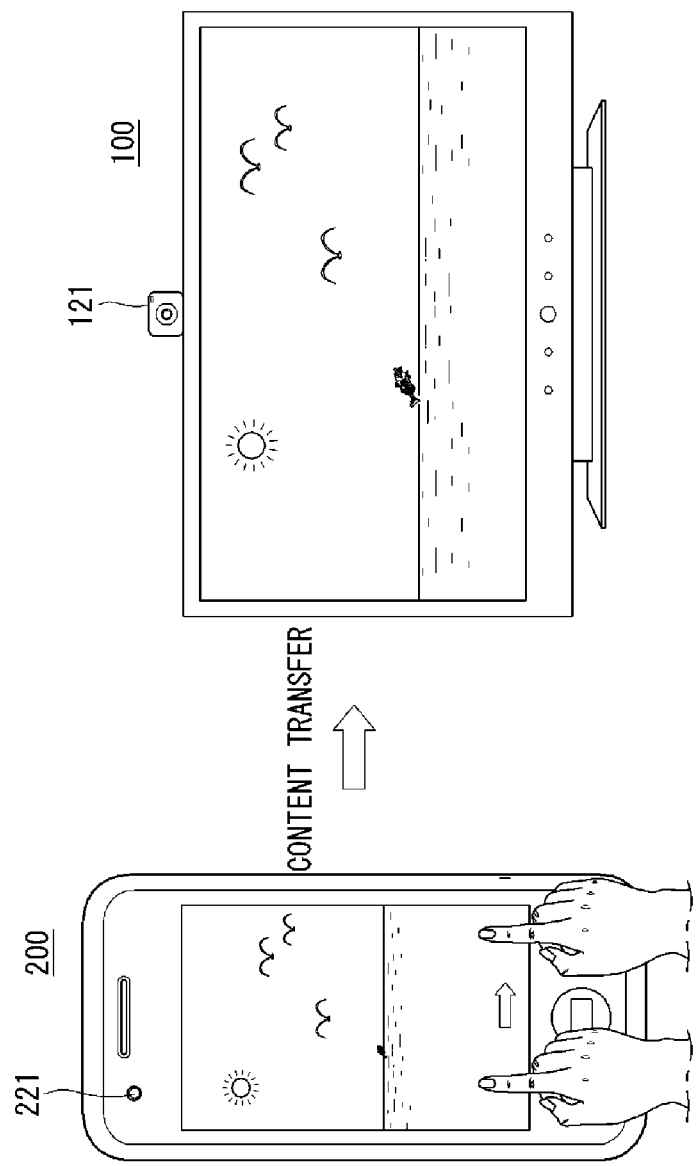
FIG. 6 illustrates an example where an image displayed on another electronic device is transferred to an electronic device according to an embodiment.

FIG. 6 illustrates an example where an image displayed on the electronic device 200 is transferred to the electronic device 100. Referring to FIGS. 5 and 6, when a user of the electronic device 200 moves a touch on the screen of the electronic device 200 toward the electronic device 100, the image displayed on the electronic device 200 is transferred to the electronic device 100 so that the same image can be displayed on the electronic device 100 and the electronic device 200.

Although not shown in FIG. 6, the electronic device 200 may transmit the displayed content to the electronic device 100 based on a gesture recognized from the image obtained by a camera 221 mounted on the electronic device 200.

Turning back to FIG. 4, when an application for controlling the received content, the controller 180 obtains a location of the user of the electronic device 100 that has transferred the content (S320). The user's location may be obtained by the step of acquiring the location of the electronic device 200 and the step of acquiring the location of the user of the electronic device 200 based on the location of the electronic device 200.

The step of acquiring the location of the electronic device 200 may be performed using a network-based wireless location determination technology and the electronic device 200.

When the user's location is acquired, the controller 180 analyzes the image obtained by the camera 121 to determine whether a predetermined gesture is recognized that corresponds to a predetermined function of an application in execution in the electronic device 100 within a predetermined time (S330 and S340).

When the gesture corresponding to the predetermined function is recognized within the predetermined time, the controller 180 performs the predetermined function of the application being executed (S350). For example, even if the user's gesture for obtaining a control right for the electronic device 100 is not recognized, the controller 180 may perform the predetermined function of the application being executed which corresponds to the predetermined gesture.

For instance, in performing the predetermined function of the application executed by the user, a control right obtaining step may be omitted or the predetermined gesture may include a gesture for obtaining a control right. According to an embodiment, the predetermined function may include functions that are often or necessarily performed such that the user may control the received content right after the content has been received. According to an embodiment, the functions may vary based on the type of the application, and may be stored in the memory 160.

For example, as shown in FIGS. 5 and 6, in the case that the application in execution in the electronic device 100 is an application for displaying and controlling an image received in an N-screen environment, the predetermined function may include, but not limited to, play of an image, control of playing speed of the image, control of screen resolution, control of screen size, or the like.

Even if the predetermined gesture is recognized after a predetermined time elapses, the controller 180 may not perform the predetermined function corresponding to the predetermined gesture. Under this situation, the user allows the controller 180 to conduct the predetermined function by taking a control right obtaining gesture for the electronic device 100 to obtain a control right, and then by taking the predetermined gesture.

Figure 7:
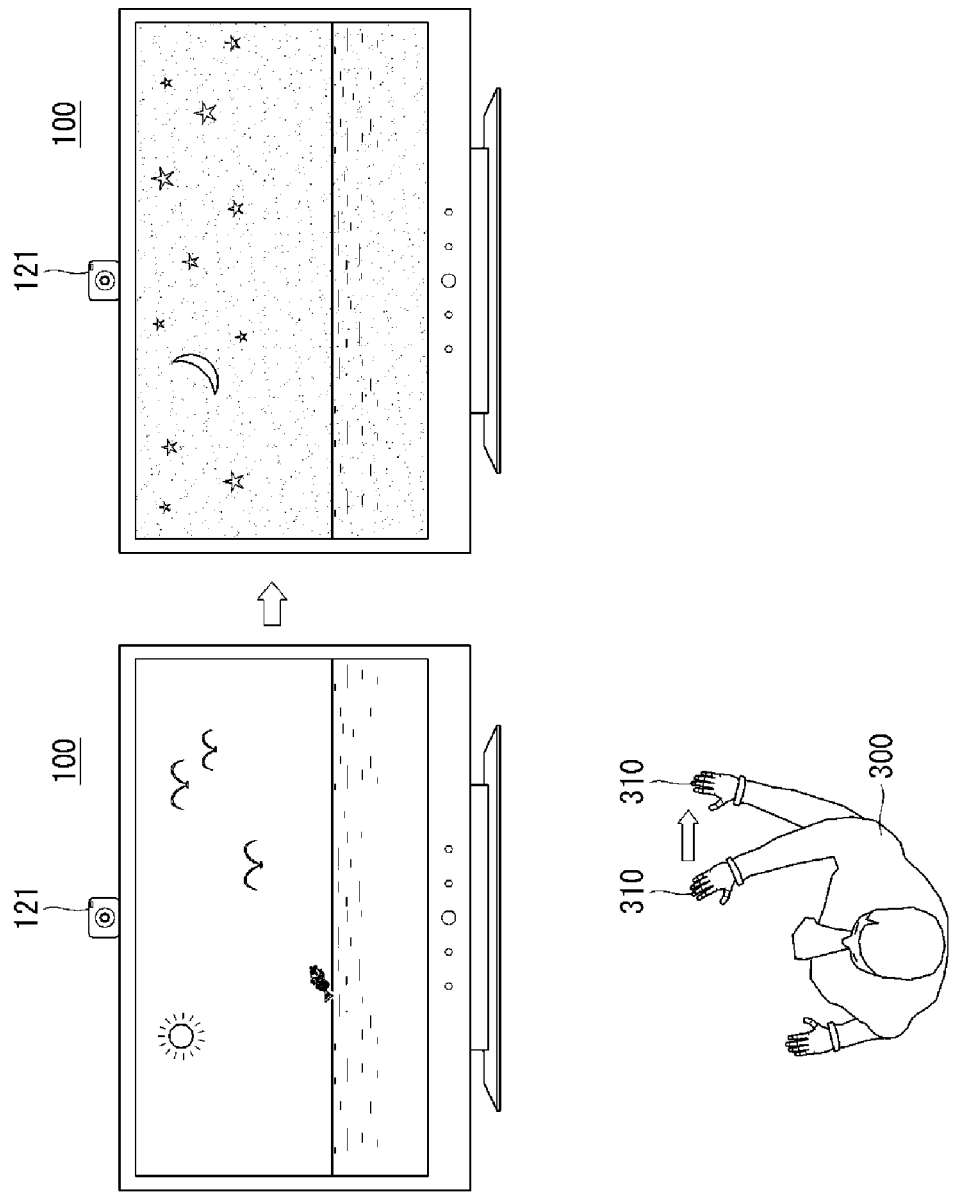
FIG. 7 illustrates an example where a user of a another electronic device performs a predetermined function of an application for controlling a received image from the another electronic device without taking a control right obtaining gesture for the electronic device.

FIG. 7 illustrates an example where a user 300 of a another electronic device performs a predetermined function of an application for controlling a received image from the another electronic device without taking a control right obtaining gesture for the electronic device 100. It is assumed that a playback speed of a playing image increases when a person who has a control right for the electronic device 100 moves his right hand 310 in a right direction. This is also true for an example to be described in connection with FIG. 8.

Referring to FIG. 7, when the user 300 moves his right hand in the right direction, the controller 180 recognizes the gesture from an image obtained by the camera 121 and increases the playback speed of the playing image based on the recognized gesture, thereby changing images displayed on the display 151 of the electronic device 100.

Figure 8:
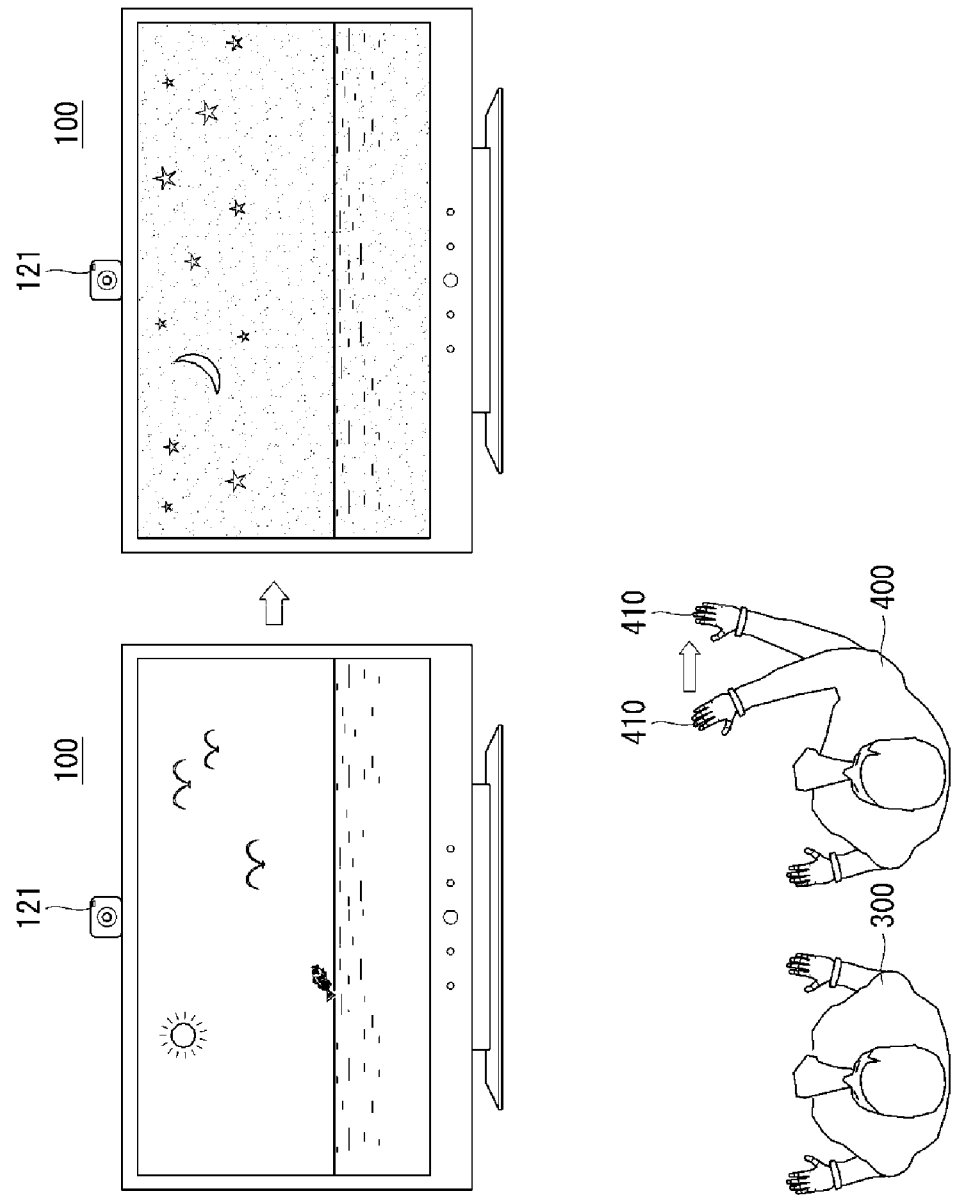
FIG. 8 illustrates an example where a user 400 other than the user 300 performs a predetermined function of an application for controlling a received image from the another electronic device without taking a control right obtaining gesture for the electronic device 100.

FIG. 8 illustrates an example where a user 400 other than the user 300 performs a predetermined function of an application for controlling a received image from the another electronic device without taking a control right obtaining gesture for the electronic device 100.

Referring to FIG. 8, when the user 400 moves his right hand 410 in the right direction, the controller 180 recognizes the gesture from an image obtained by the camera 121 and increases the playback speed of the playing image based on the recognized gesture, thereby changing images displayed on the display 151 of the electronic device 100.

It has been described in connection with FIGS. 4 to 8 that a user performs a predetermined function related to image control by taking a gesture without a separate control right obtaining gesture for the electronic device that received an image. However, the embodiments are not limited thereto. For example, according to an embodiment, in the case that the content received by the another electronic device is a text file, the user of the another electronic device may also perform the predetermined function of the application for controlling the text file without taking a separate control right gesture.

Figure 9:
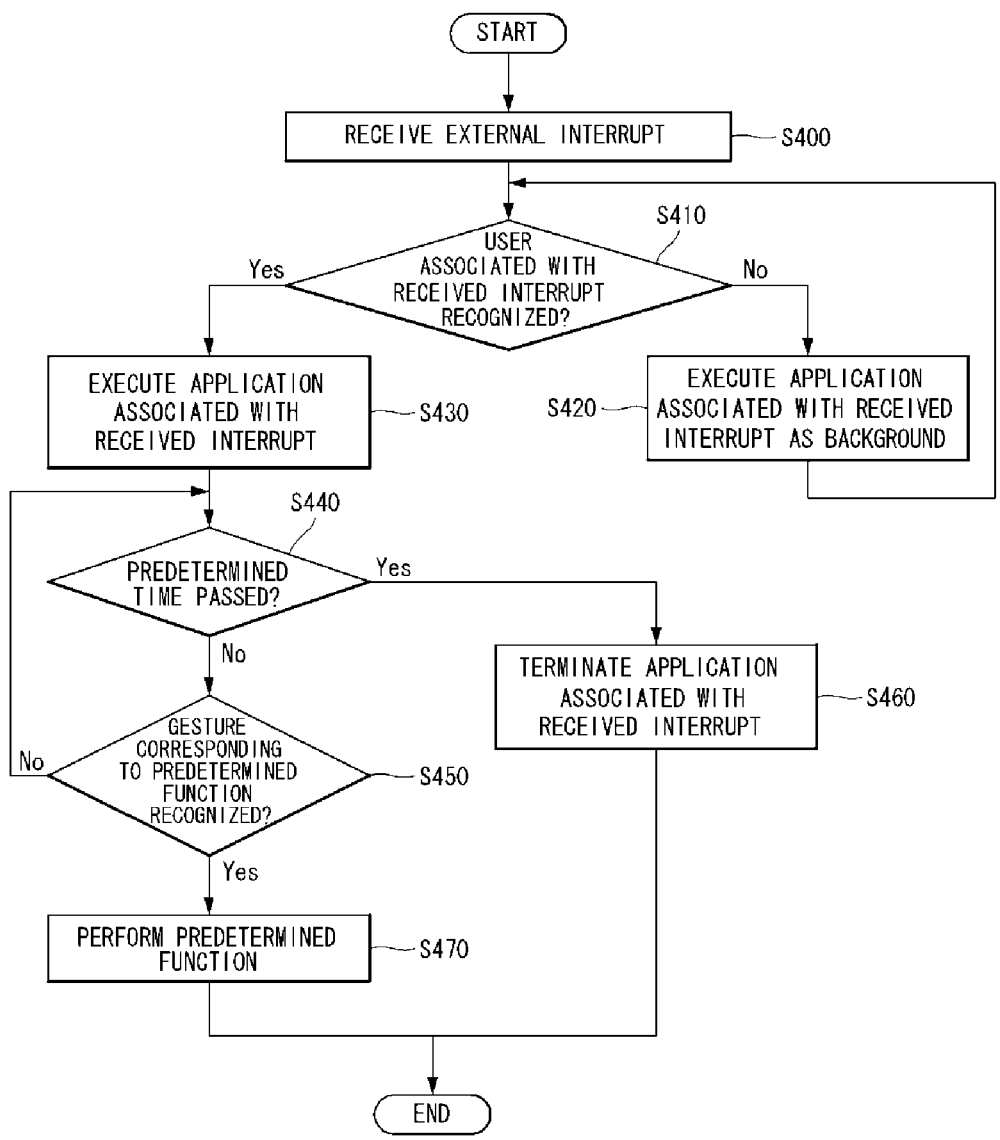
FIG. 9 is a flowchart illustrating a method of controlling an electronic device according to an embodiment.

FIG. 9 is a flowchart illustrating a method of controlling an electronic device according to an embodiment. Specifically, FIG. 9 illustrates an example where when an external interrupt is received, a user associated with the interrupt may perform a predetermined function of an application associated with the interrupt without obtaining a control right for the electronic device 100. Hereinafter, the method of controlling an electronic device will be described with reference to FIG. 9.

The electronic device 100 receives an external interrupt (S400). Then, the controller 180 of the electronic device 100 analyzes an image obtained by the camera 121 to determine whether there is recognized a user associated with the external interrupt (S410). According to embodiments, the "user associated with the external interrupt" may include a single user or a plurality of users.

For example, if the external interrupt is a call receipt interrupt or a message receipt interrupt that is targeted for a specific user only, only the specific user is the user associated with the external interrupt. As long as the external interrupt is targeted for a plurality of users, each of the plurality of users may be the user associated with the external interrupt.

According to an embodiment, information on the user associated with the external interrupt, for example, information on the user's face, may be stored in the memory 160. The controller 180 may perform face recognition on an obtained image using the stored user's face information, and may recognize the user associated with the external interrupt based on a result of the face recognition and the information on the user associated with the external interrupt.

If a result of image analysis shows the user associated with the external interrupt is not recognized, the controller 180 may repetitively determine whether the user associated with the external interrupt (S410) while performing an application associated with the received external interrupt as a background (S420).

If the user associated with the external interrupt is recognized as a result of image analysis, the controller 180 executes an application associated with the external interrupt (S430) and determines whether a gesture is recognized that corresponds to a predetermined function of the application within a predetermined time (S440 and S450).

If the predetermined gesture is not recognized within the predetermined time, the controller 180 terminates the application associated with the external interrupt (S460). However, if the predetermined gesture is recognized within the predetermined time, the controller 180 performs a predetermined function corresponding to the predetermined gesture (S470).

Although not shown in FIG. 9, if the user associated with the external interrupt, the controller 180 may store information on the external interrupt in the memory 160. Then, if the user associated with the external interrupt is recognized, the controller 180 may output the stored information associated with the external interrupt.

Figure 11:
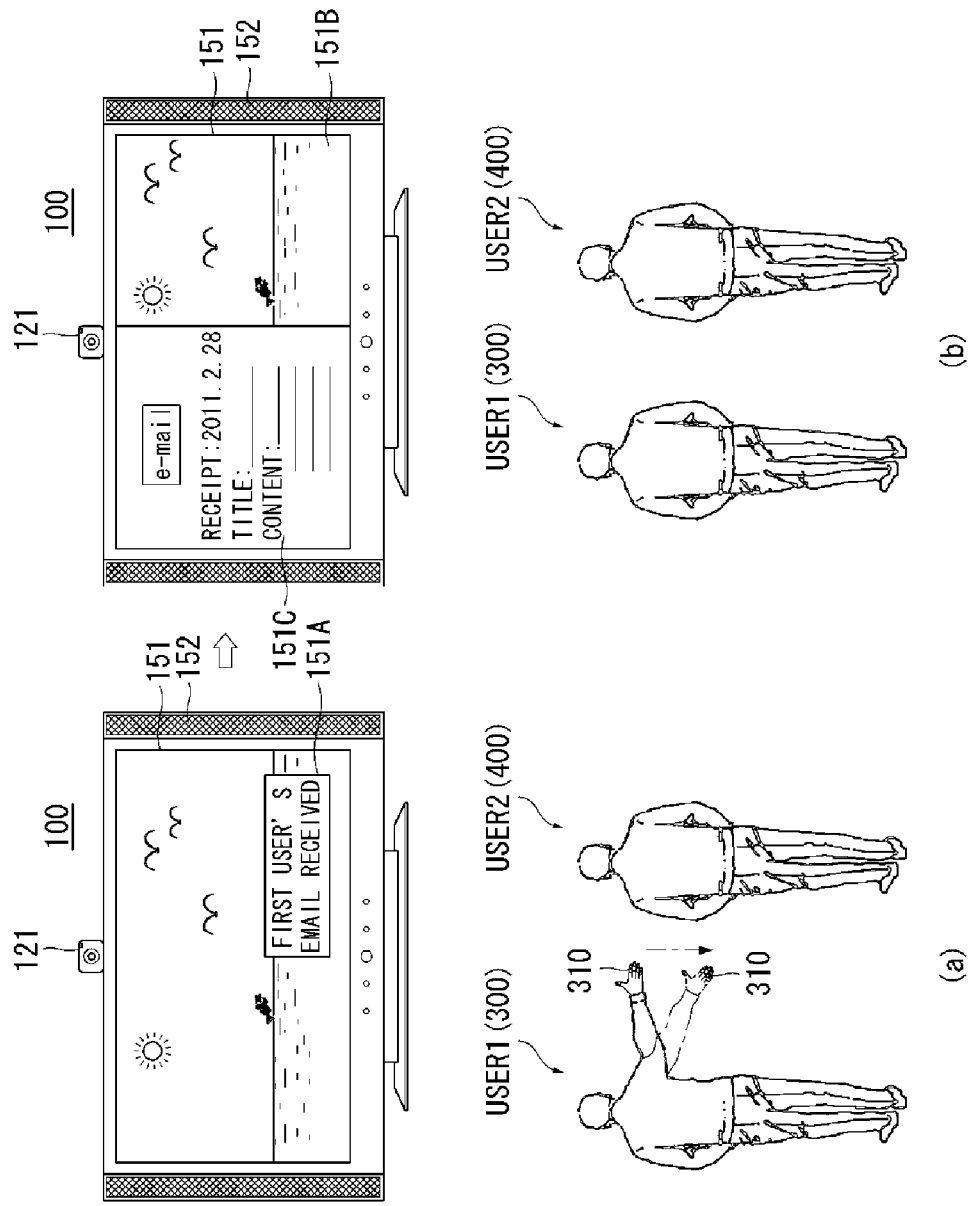

FIGS. 10 and 11 illustrate examples of performing the method of controlling an electronic device as described in connection with FIG. 9 when an email receipt interrupt is received. FIG. 10 illustrates an example where an email receipt interrupt for a first user 300 takes place while the first user 300 and a second user 400 watch a smart TV 100.

The controller 180 of the smart TV 100 executes an application for notifying the receipt of an email and displays an email receipt notification message 151A on the display 151. The controller 180 may also output a message of notifying the receipt of the email through the audio output unit 152.

When the first user 300 makes a predetermined gesture, for example, lowers his right hand 310, to check the received email while the email receipt notification message 151A is displayed as shown in (a) of FIG. 11, the controller 180 of the smart TV 100 displays the received email on the display 151 of the smart TV 100 as shown in (b) of FIG. 11.

Referring to (b) of FIG. 11, the controller 180 of the smart TV 100 divides the screen of the display 151 into a first region 151B for displaying the original image and a second region 151C for displaying an email, and displays the received email on the second region 151C.

Even if the second user 400 unrelated to the received email makes a gesture of checking the received email while an email receipt interrupt occurs for the first user 300 so that an application for displaying the received email is in execution, the controller 180 does not recognize the second user's gesture as a gesture for checking an email since the second user 400 is not the user associated with the email receipt interrupt.

Figure 13:
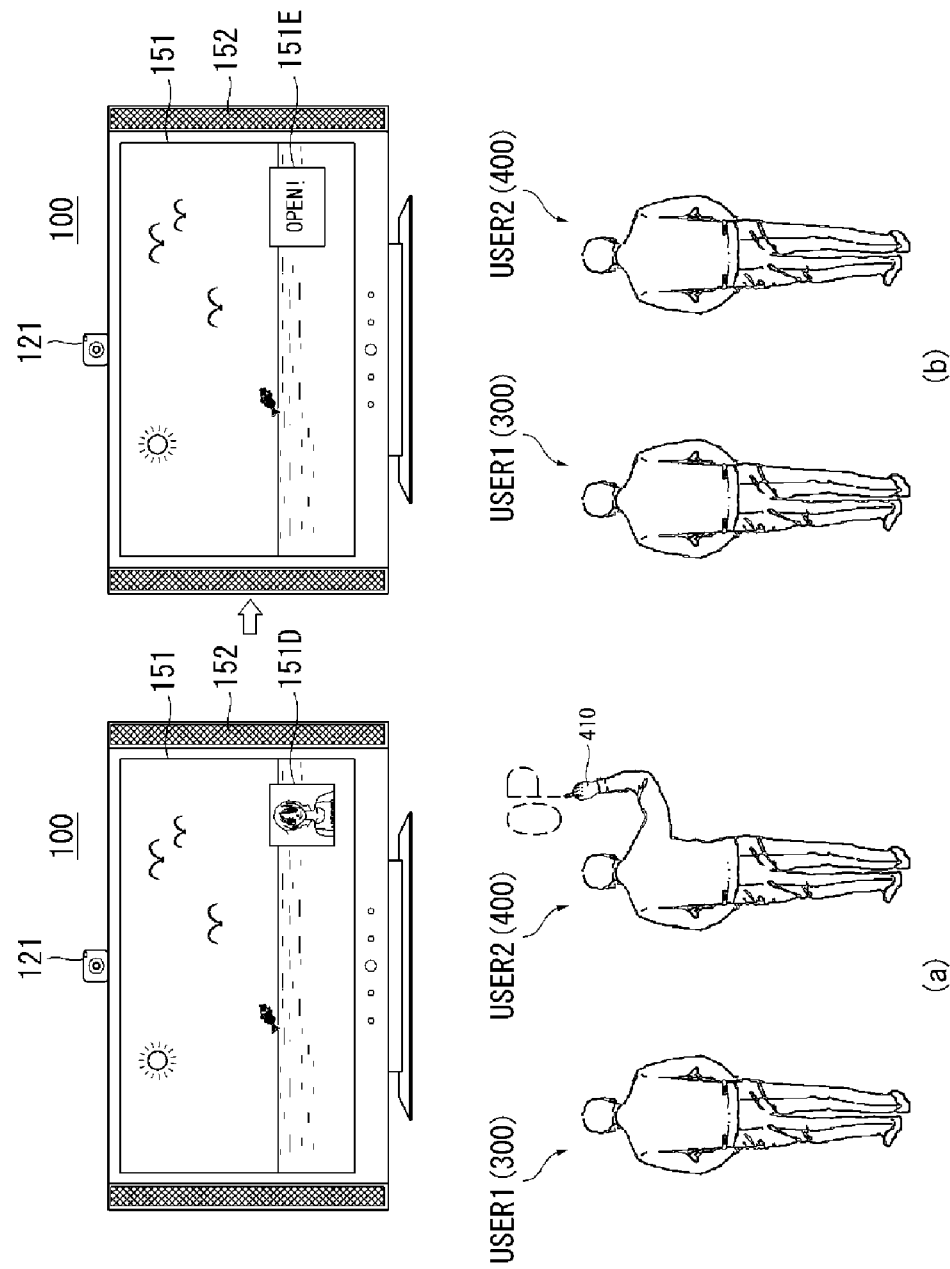

FIGS. 12 and 13 illustrate examples of performing the method of controlling an electronic device as described in connection with FIG. 9 when a visit notification interrupt is received from a device opening/closing a door. Referring to FIG. 12, a visit notification interrupt occurs from the door opening/closing device while the first user 300 and the second user 400 watch the smart TV 100.

Then, the controller 180 of the smart TV 100 executes a door control application for notifying a visit and displays an image 151D obtained by the door opening/closing device on the display 151. The controller 180 may display a message for notifying the visit through the audio output unit 152 as well.

The second user 400 makes a predetermined gesture for opening the door, for example, writes characters "OP" with his right hand 310 while the visitor's image 151D is displayed as shown in (a) of FIG. 13. Then, in response to the gesture, the controller 180 of the smart TV 100 opens the door and displays a message 151E saying the door has been opened on the display 151 of the smart TV 100 as shown in (b) of FIG. 13.

Even if the first user 300 makes a gesture for opening the door while the visitor's image 151D is displayed, the controller 180 recognizes the first user's gesture as a gesture for door opening and opens the door. For example, the second user 400 may consider the first user 300 as a user associated with the visit notification interrupt.

Figure 14:
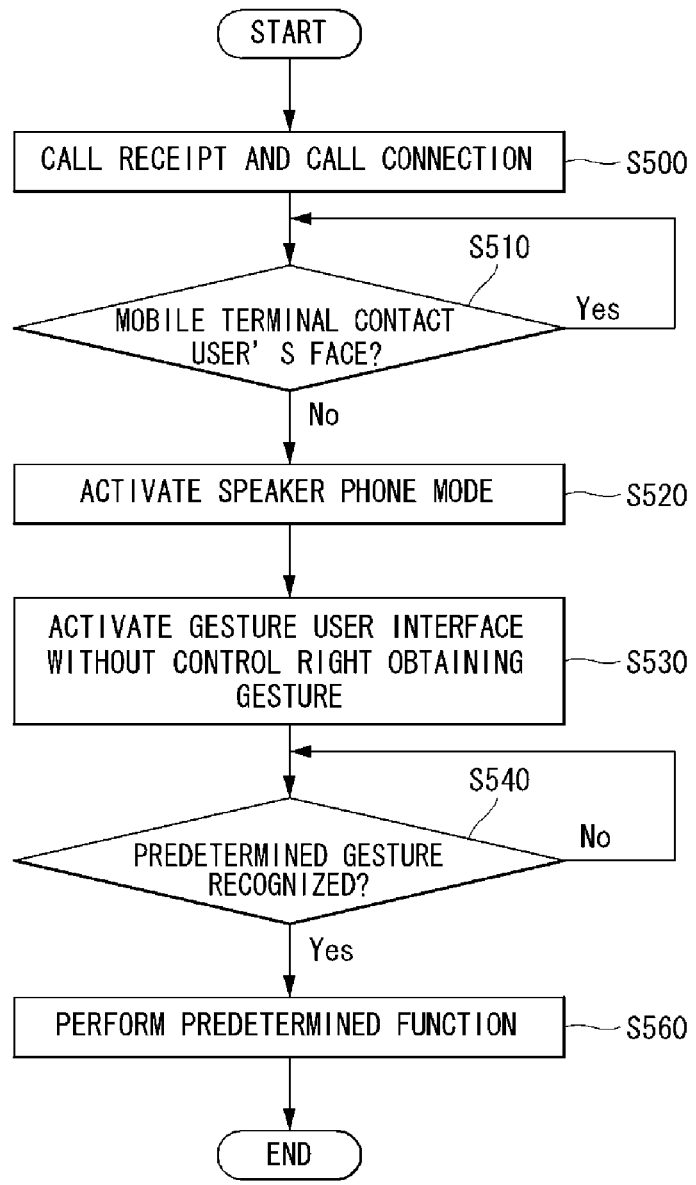
FIG. 14 is a flowchart illustrating a method of controlling an electronic device according to an embodiment.

FIG. 14 is a flowchart illustrating a method of controlling an electronic device according to an embodiment. Specifically, FIG. 14 illustrates an example where the user 300 may perform a call-related predetermined function using a gesture without a step of obtaining a control right when the user 300 takes his face off the mobile terminal 100 while on the phone. The method of controlling an electronic device will now be described with reference to FIG. 14.

When a call is received, the controller 180 of the mobile terminal 100 connects the call to a calling terminal based on the user's selection (S500). While the call is connected, the controller 180 continues to detect whether the mobile terminal 100 is brought in contact with the user's face (S510). Whether the mobile terminal 100 is in contact with the user's face may be detected by a proximity sensor or an infrared sensor mounted in the mobile terminal 100.

If it is sensed that the mobile terminal 100 is not in contact with the user's face, for example, if it is determined that the mobile terminal 100 is taken away from the user's face, the controller 180 activates a speaker phone mode among operation modes of the mobile terminal 100 (S520) and activates a gesture user interface of the mobile terminal 100 without the user's control right obtaining step (S530). Then, the user may control various operations of the mobile terminal 100 using gestures while performing a call by the speaker phone.

If a predetermined gesture of the user 300 is recognized while the gesture user interface is activated (S540), the controller 180 performs a predetermined function corresponding to the predetermined gesture (S560). Examples of the predetermined function that may be performed during the call may include, but not limited to, an on-call note function, a third party's call add function, a contact search function, and a dial tone recording function.

Figure 15:
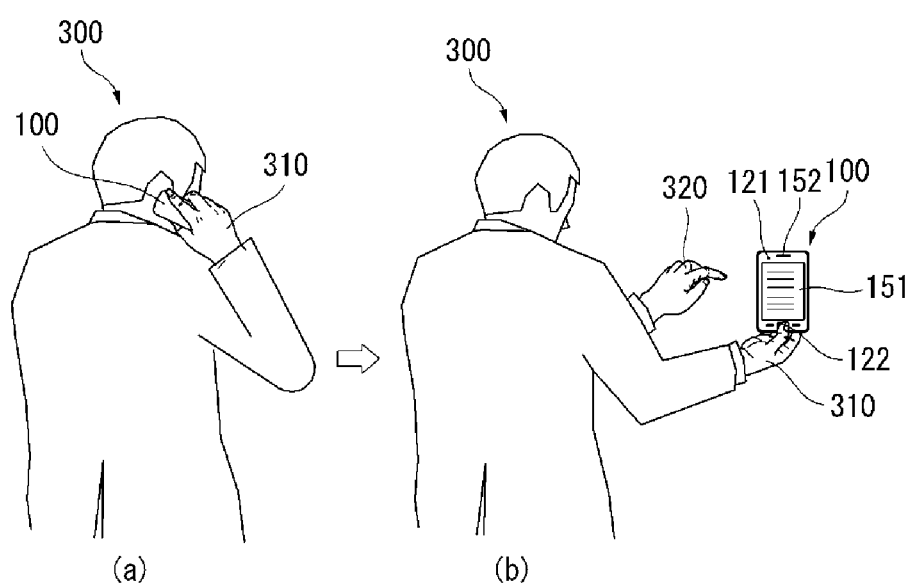
FIG. 15 illustrates an example where on a call, the user 300 takes the mobile terminal 100 off his face to perform a call in a speaker phone mode and controls the operation of the mobile terminal 100 through a gesture user interface using his left hand 320 according to the method of controlling the mobile terminal described in connection with FIG. 14.

FIG. 15 illustrates an example where on a call, the user 300 takes the mobile terminal 100 off his face to perform a call in a speaker phone mode and controls the operation of the mobile terminal 100 through a gesture user interface using his left hand 320 according to the method of controlling the mobile terminal described in connection with FIG. 14.

If the user 300 takes the mobile terminal 100 off his face during the call shown in (a) of FIG. 15, the mobile terminal 100 shifts the mobile terminal 100 to a speaker phone mode. Referring to (b) of FIG. 15, the controller 180 may transfer the called party's voice to the user 300 through the speaker 152, may transfer the user's voice received through the microphone 122 to the called party, and may perform various operations based on gestures received through the camera 121.

Figure 16:
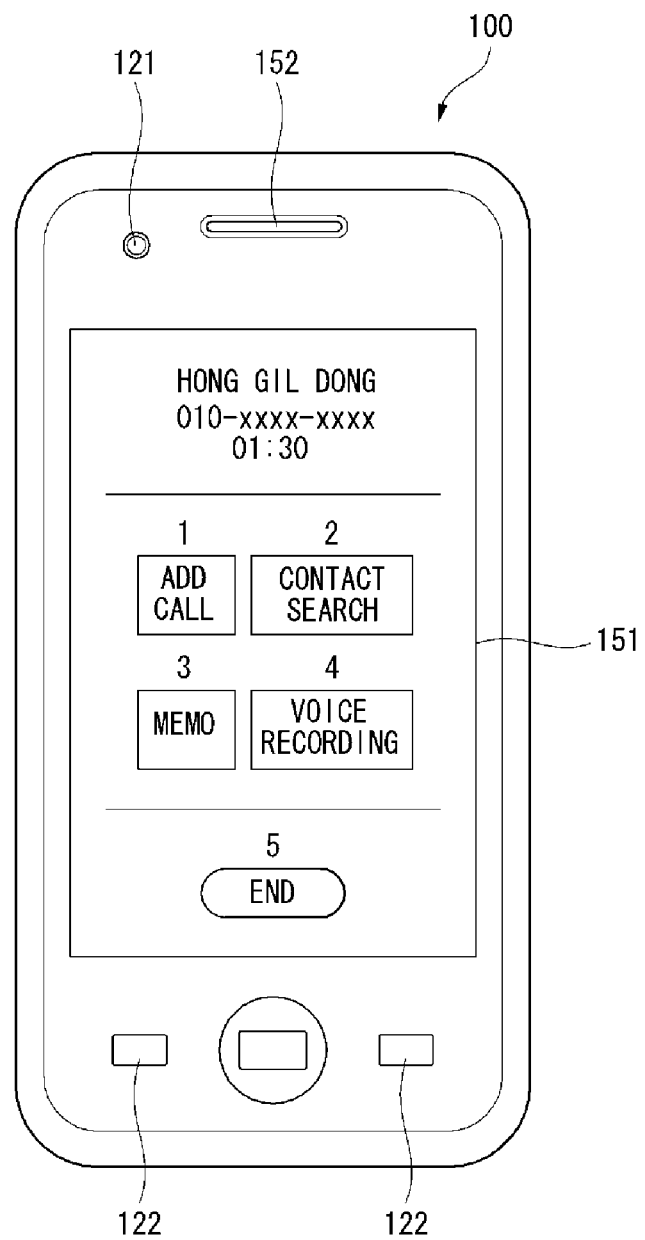
FIG. 16 illustrates an example screen of the mobile terminal 100 whose user interface is activated by a user's left hand 320 during a call according to the method of controlling an electronic device described in connection with FIG. 14.

FIG. 16 illustrates an example screen of the mobile terminal 100 whose user interface is activated by a user's left hand 320 during a call according to the method of controlling an electronic device described in connection with FIG. 14. Referring to FIG. 16, the screen 151 of the mobile terminal 100 includes call-related information, such as, for example, a called party's name and phone number, and a call time.

Besides, the screen of the mobile terminal 100 includes a call add function, a contact search function, a note function, and a voice recording function that may be controlled by the user's gestures. Gestures corresponding to the respective functions may be preset so that the controller 180 may perform the functions respectively corresponding to the gestures when the gestures are received through the camera 121.

According to an embodiment, the user 300 may perform a function corresponding to a gesture by taking the gesture using his left hand 320, for example, by writing a number positioned over the function using his left hand 320. As described in connection with FIGS. 14 to 16, a user may perform various functions associated with a call without taking a separate control right obtaining gesture during the call.

Figure 17:
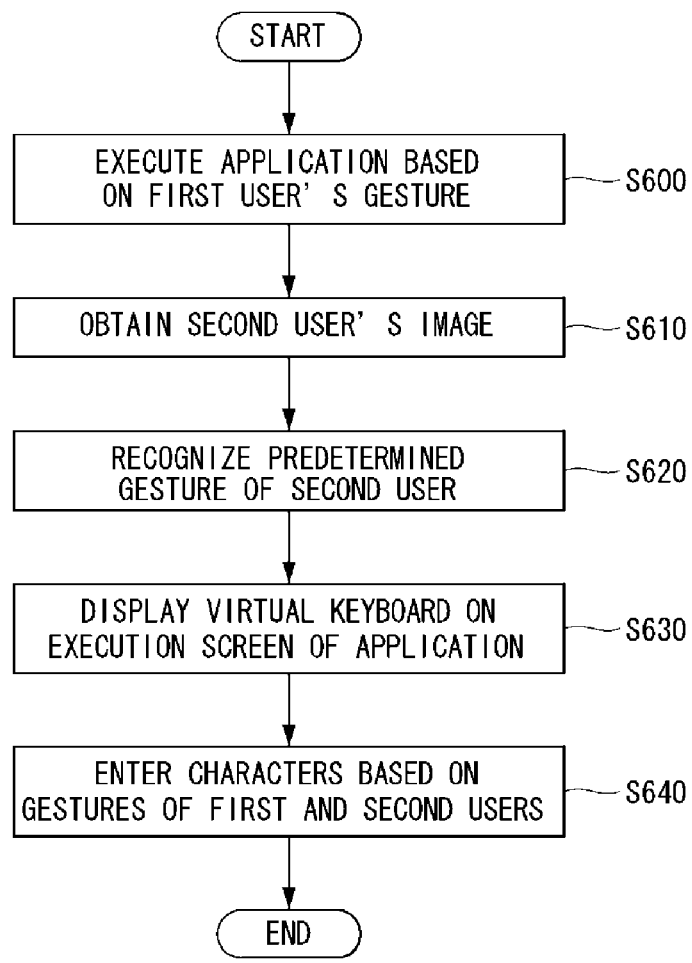
FIG. 17 is a flowchart illustrating a method of controlling an electronic device according to an embodiment.

FIG. 17 is a flowchart illustrating a method of controlling an electronic device according to an embodiment. Specifically, FIG. 17 illustrates an example where while a first user who has a control right for the electronic device 100 executes an application in the electronic device 100, a second user who does not possess a control right for the electronic device 100 using a gesture displays a virtual keyboard on an execution screen of the application without a step of obtaining a control right. The method of controlling an electronic device will now be described with reference to FIG. 17.

The controller 180 of the electronic device 100 executes an application based on a gesture of a first user who has a control right for the electronic device 100 (S600) and displays an execution screen of the application on the display 151. While the execution screen is displayed on the display 151, the controller 180 obtains an image of a second user who does not have a control right for the electronic device 100 using a gesture as well as an image of the first user (S610).

Thereafter, the controller 180 analyzes the obtained images to recognize a predetermined gesture of the second user (S620). When the second user's gesture is recognized, the controller 180 displays a virtual keyboard on an execution screen of the application (S630).

Then, the controller 180 enters characters selected by a character input gesture of the first or second user among included characters to a character input area of the execution screen (S640). According to an embodiment, the character input area of the execution screen may include, but not limited to, a character input area of a word processing application, or an input area of an ID or password for various applications.

Figure 18:
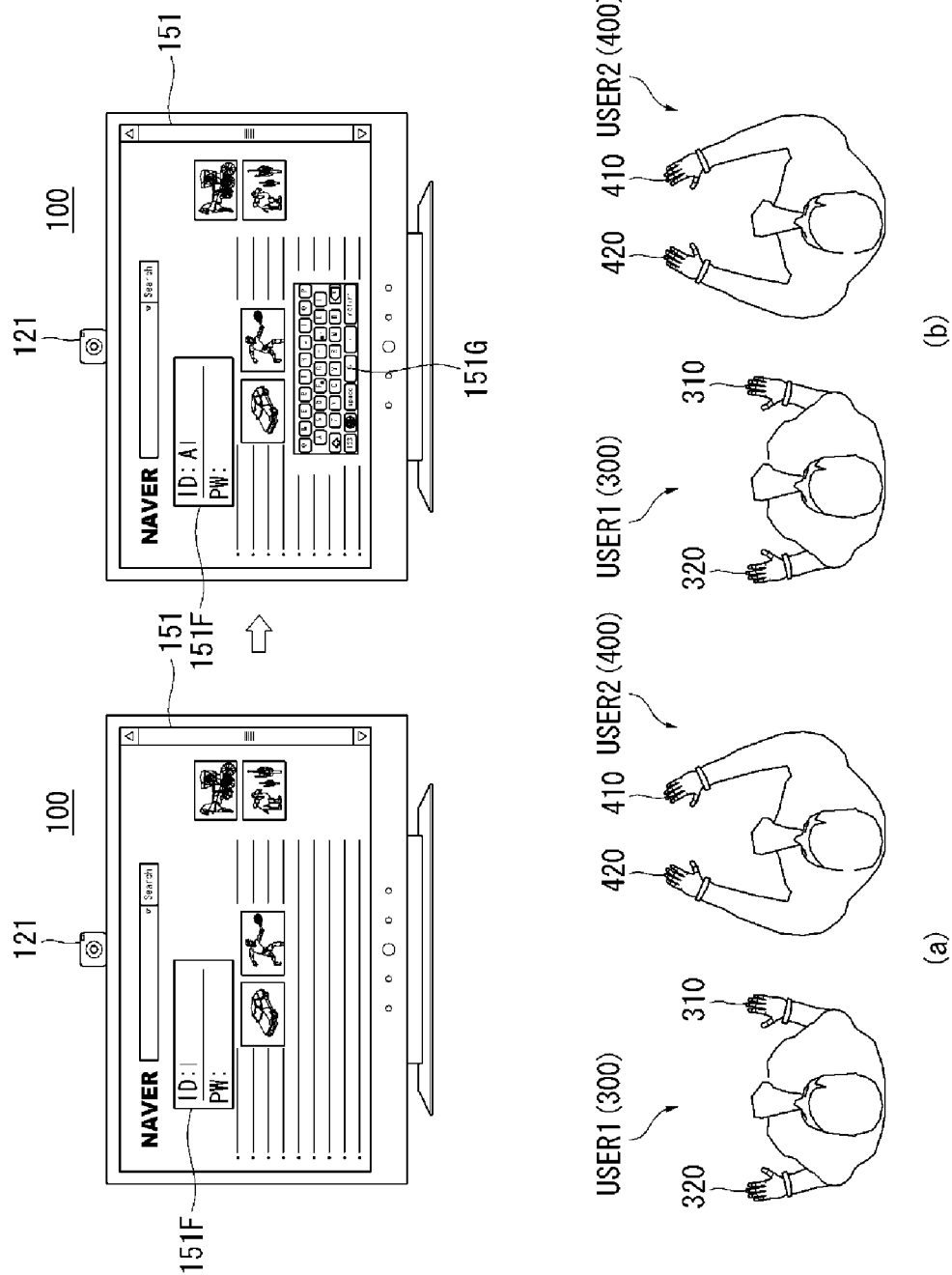
FIG. 18 illustrates an example a user who does not possess a control right for the electronic device 100 using a gesture displays a virtual keyboard on an execution screen of the application executing in the electronic device 100 without a step of obtaining a control right for the electronic device 100 in the method of controlling an electronic device described in connection with FIG. 17.

FIG. 18 illustrates an example a user who does not possess a control right for the electronic device 100 using a gesture displays a virtual keyboard on an execution screen of the application executing in the electronic device 100 without a step of obtaining a control right for the electronic device 100 in the method of controlling an electronic device described in connection with FIG. 17.

Referring to (a) of FIG. 18, an execution screen of a web browsing application executed based on a gesture of the first user 300 who has a control right for the electronic device 100 is displayed on the display 151. Further, the execution screen of the web browsing application includes an area 151F for entering a user's ID and password. The second user 400 who does not possess a control right for the electronic device 100 makes a gesture, for example, raise his two hands 410 and 420, to display a virtual key board on the execution screen of the web browsing application.

Then, the controller 180 of the electronic device 100, as shown in (b) of FIG. 18, displays a virtual key board 151G on the execution screen of the web browsing application for entering characters based on the gesture of the second user 400. The controller 180 enters characters to the area 151F for entering an ID and a password based on the gesture of the second user 400 as well as a gesture of the first user 300. It can be seen in (b) of FIG. 18 that "A" is entered to the area for entering an ID based on the gesture of the second user 400.

There might be a situation where not only the first user 300 with the control right for the electronic device 100 but also the second user 400 with no control right for the electronic device 100 needs to enter characters. An example situation is illustrated in FIG. 18 where a predetermined web page is logged in with an ID of the second user 400.

Alternately, the controller 180 may also display a virtual keyboard on the execution screen of the web browsing application even when not the second user 400 but the first user 300 makes a gesture, for example, raises his two hands 310 and 320. Even under this situation, the controller 180 may enter characters using the virtual keyboard based on the gesture of the first user 300 or the second user 400.

Figure 19:
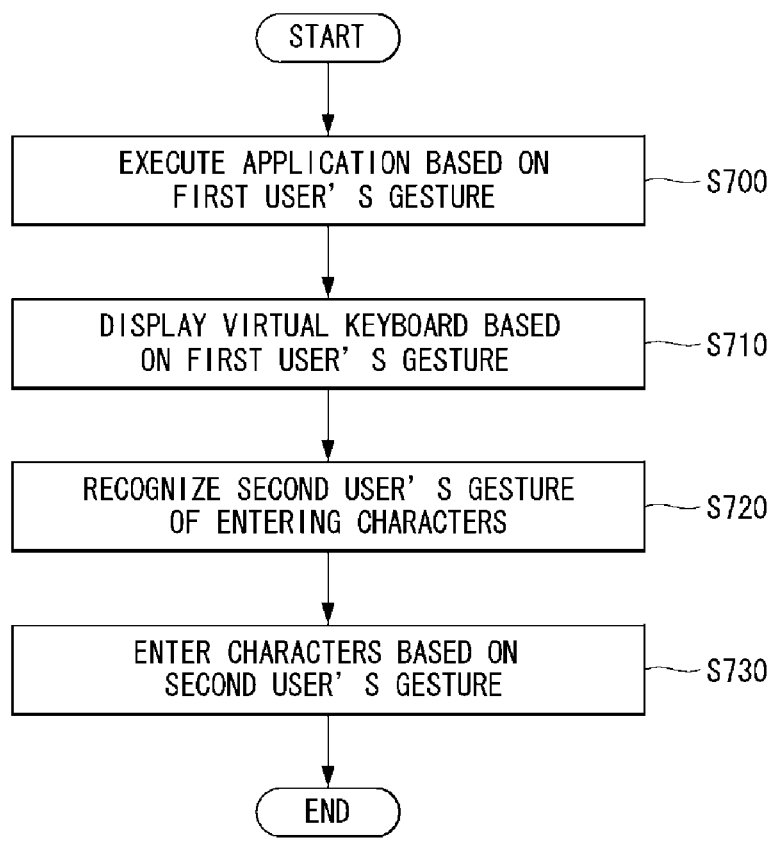
FIG. 19 is a flowchart illustrating a method of controlling an electronic device according to an embodiment.

FIG. 19 is a flowchart illustrating a method of controlling an electronic device according to an embodiment. Specifically, FIG. 19 illustrates an example where the second user with no control right for the electronic device 100 using a gesture enters characters on the execution screen of an application executed by the first user with a control right for the electronic device 100 in the electronic device 100 using a virtual keyboard without a step of obtaining a control right.

The controller 180 of the electronic device 100 executes an application based on a gesture of the first user who has a control right for the electronic device 100 (S700), and displays an execution screen of the application on the display 151. With the execution screen displayed on the display 151, the controller 180 displays a virtual keyboard for entering characters on the display 151 based on a gesture of the first user 300 (S710).

Then, the controller 180 obtains images of the first user and a second user with no control right for the electronic device 100 using a gesture by the camera 121 and analyzes the images to recognize the second user's specific gesture (S720).

When the second user's specific gesture is recognized, the controller 180 enters selected characters among characters included in the virtual keyboard on a character input area in the execution screen of the application based on the recognized gesture (S730). The first user 300 may also enter characters in the execution screen of the application using the virtual keyboard.

For example, according to the method of controlling an electronic device described in connection with FIG. 19, even a user who does not possess a control right for the electronic device 100 using a gesture, if necessary, may enter characters on the execution screen of the application using the virtual keyboard without a step of obtaining a control right.

Figure 20:
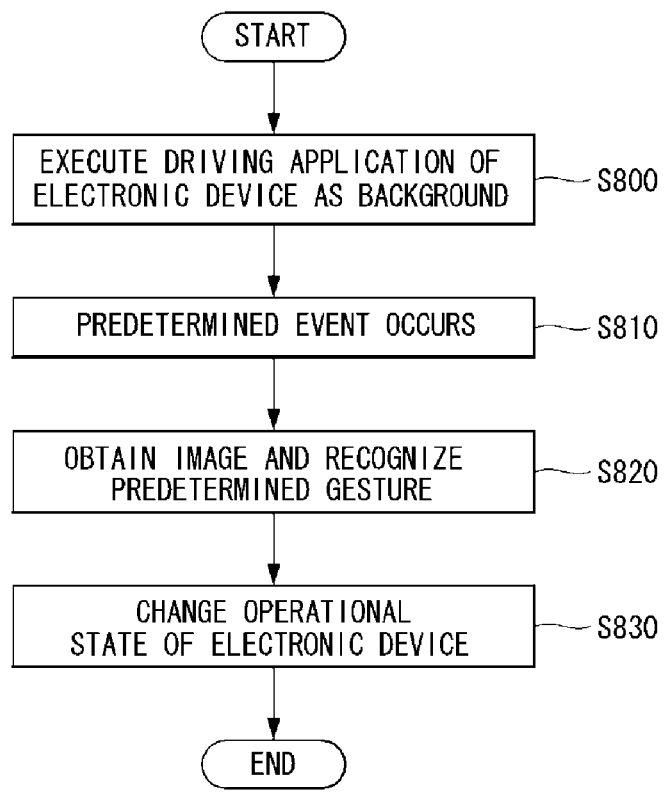
FIG. 20 is a flowchart illustrating a method of controlling an electronic device according to an embodiment.

FIG. 20 is a flowchart illustrating a method of controlling an electronic device according to an embodiment. Specifically, FIG. 20 illustrates an example where an operational state of the electronic device 100 is changed based on a gesture of a user who does not possess a control right for the electronic device 100 using a gesture when a predetermined event occurs. A method of controlling an electronic device will now be described with respect to FIG. 20.

When power is supplied to the electronic device 100, the controller 180 of the electronic device 100 executes a driving application of the electronic device 100 as a background (S800) and executes a second application selected by a user of the electronic device 100. As used herein, the "driving application" refers to an application pre-mounted in the electronic device 100 to control the operation of the electronic device 100 unlike other applications that are application programs for achieving a predetermined purpose.

If a predetermined event occurs during the execution of the driving application and the second application of the electronic device 100 (S810), the controller 180 of the electronic device 100 obtains a user's image by the camera 121 and analyzes the obtained image to recognize a specific gesture of the user (S820). The "specific gesture" may refer to a predetermined gesture for changing operational states of the electronic device 100.

Then, the controller 180 changes the electronic device 100 to have an operational state corresponding to the specific gesture irrespective of the execution state of the executing second application (S830). As used herein, the "operational state of the electronic device 100" may include, but not limited to, a sound output state and an image output state of the electronic device 100 and a power supply mode.

Figure 21:
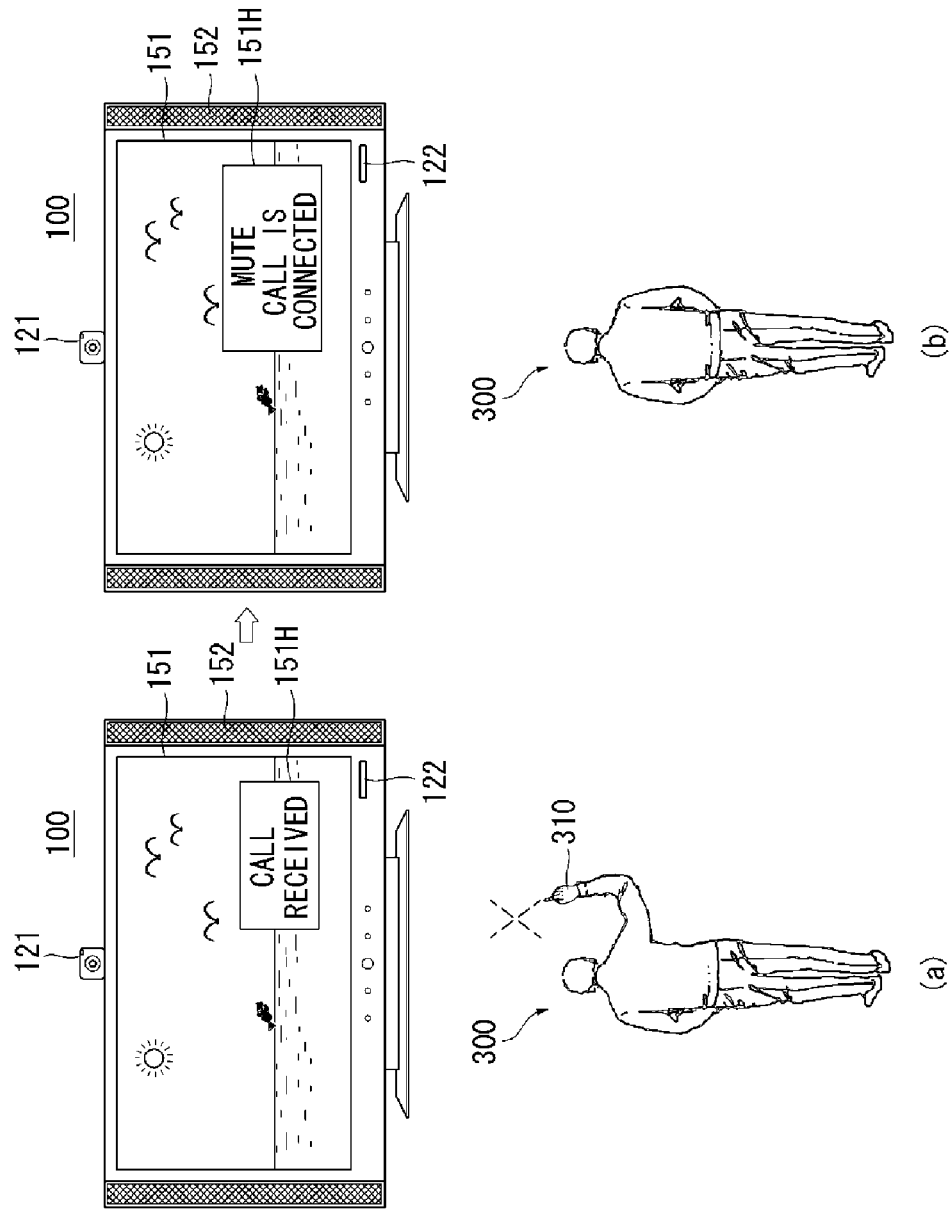
FIG. 21 illustrates an example of blocking a sound output of the electronic device 100 based on a user's gesture recognized after a call receipt event occurs according to the method of controlling an electronic device described in connection with FIG. 20.

FIG. 21 illustrates an example of blocking a sound output of the electronic device 100 based on a user's gesture recognized after a call receipt event occurs according to the method of controlling an electronic device described in connection with FIG. 20.

Referring to (a) of FIG. 21, when an even occurs that receives a call from the outside while a user views an image played by an image playback application in the electronic device 100, the controller 180 of the electronic device 100 displays a call receipt message on an event information display area 151H of the display 151.

Under the situation shown in (a) of FIG. 21, the user 300 makes a gesture of writing the letter "X" that corresponds to a mute function using his right hand 310. Then, the controller 180, as shown in (b) of FIG. 21, performs the mute function and call connection. By doing so, the user 300 may listen to the calling party's voice through the audio output unit 152 without output of a sound associated with the playing image, and may transfer his voice to the calling party through the microphone 122. According to embodiments, the phone function (for example, function of transmitting or receiving calls to/from the outside) may be included in the electronic device 100 or may be provided by the electronic device 100 interworking with any other electronic device.

Figure 22:
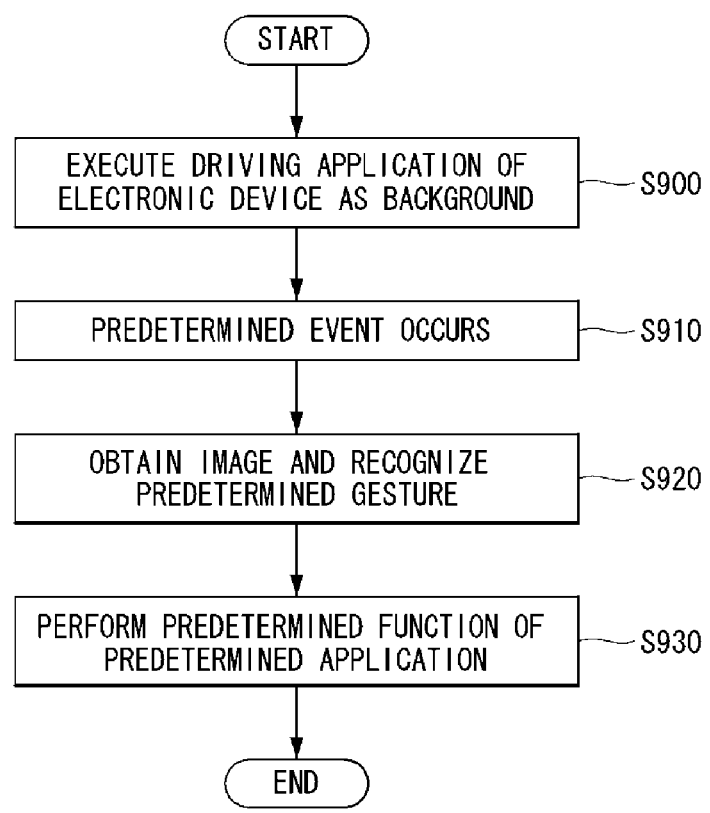
FIG. 22 is a flowchart illustrating a method of controlling an electronic device according to an embodiment.

FIG. 22 is a flowchart illustrating a method of controlling an electronic device according to an embodiment. Specifically, FIG. 22 illustrates an example where when a predetermined event occurs, a predetermined function of a predetermined application is performed based on a gesture of a user who does not possess a control right for the electronic device 100 using a gesture. The method of controlling an electronic device will now be described with reference to FIG. 22.

When power is supplied to the electronic device 100, the controller 180 of the electronic device 100 executes a driving application of the electronic device 100 as a background (S900) and a second application selected by a user of the electronic device 100.

When a predetermined even occurs while the driving application and the second application of the electronic device 100 are executed (S910), the controller 180 obtains the user's image by the camera 121 and analyzes the obtained image to recognize the user's predetermined gesture (S920).

When the predetermined gesture is recognized, the controller 180 performs a predetermined function of a predetermined application that corresponds to the recognized predetermined gesture irrespective of the execution state of the executing second application (S930).

Figure 23:
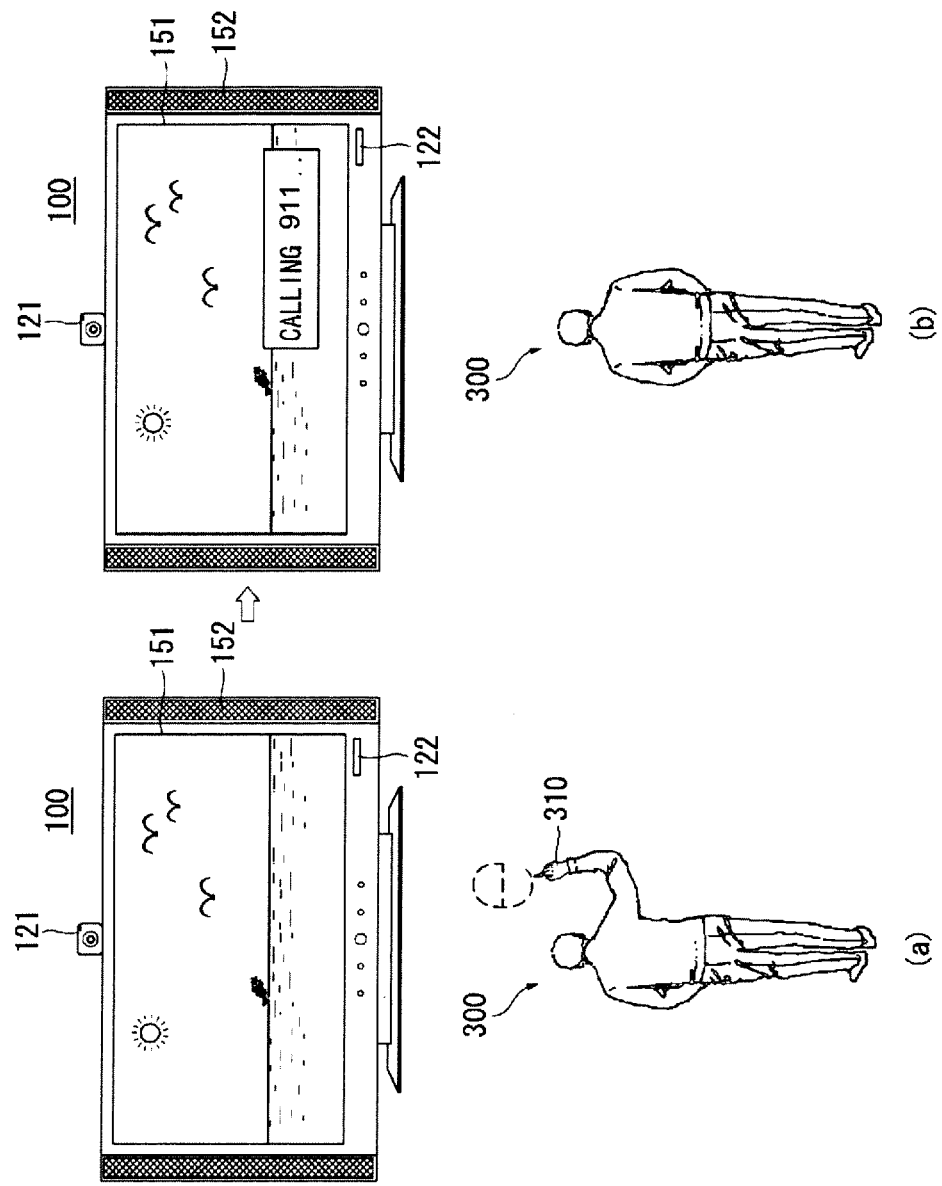
FIG. 23 illustrates an example where an emergency call of a phone application is performed based on a gesture of the user 300 that is recognized after an emergency occurs according to the method of controlling an electronic device described in connection with FIG. 22.

FIG. 23 illustrates an example where an emergency call of a phone application is performed based on a gesture of the user 300 that is recognized after an emergency occurs according to the method of controlling an electronic device described in connection with FIG. 22.

Referring to (a) of FIG. 23, while viewing an image played by an image playback application executed in the electronic device 100, the user 300 makes a gesture of writing the character "e" that corresponds to an emergency call origination function using his right hand 310. Then, the controller 180 may perform an emergency call connection as shown in (b) of FIG. 23.

Also in this example, the controller 180 may block the output of a sound associated with the playing image for the emergency call. Then, the user 300 may listen to the calling party's voice through the audio output unit 152 and may transfer his voice to the calling party through the microphone 122. According to embodiments, the phone function (for example, a function of transmitting or receiving calls to/from the outside) may be included in the electronic device 100 or may be provided by the electronic device 100 interworking with any other electronic device.

It has been illustrated in FIG. 23 that the controller 180 recognizes an emergency based on the user's predetermined gesture. Alternately, the controller 180 may also recognize the emergency by analyzing an image obtained by the camera 121 or by detecting the user's physiological signals, such as body temperature or heart rate.

Figure 24:
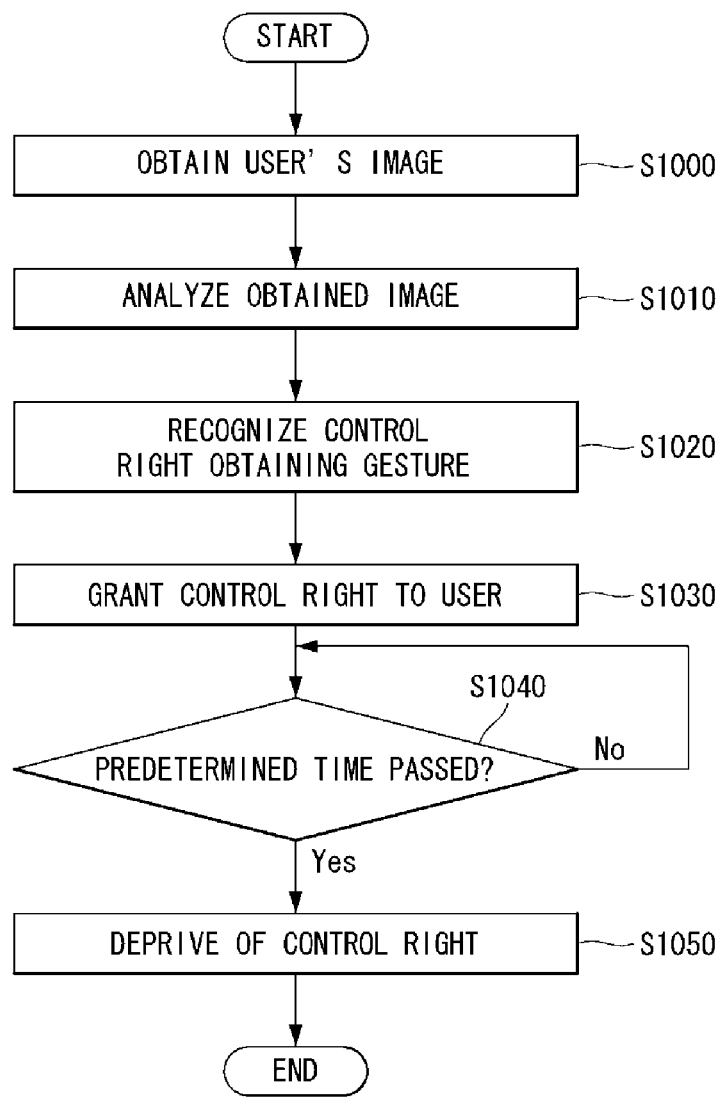
FIG. 24 is a flowchart illustrating a method of controlling an electronic device according to an embodiment.

FIG. 24 is a flowchart illustrating a method of controlling an electronic device according to an embodiment. The method of controlling an electronic device will now be described with reference to FIG. 24.

The electronic device 1000 obtains a user's image through the camera 121 (S1000), and the controller 180 of the electronic device 100 analyzes the obtained image (S1010) to recognize the user's control right obtaining gesture (S1020). When the user's control right obtaining gesture is recognized, the controller 180 grants the user a control right for the electronic device 100 (for example, a control right allowing the user to control the electronic device 100 using his gestures) (S1030) and determines whether a predetermined time has elapsed after the control right was granted to the user (S1040).

If it is determined that the predetermined time has elapsed, the controller 180 deprives the user of the control right (S1050). Specifically, if any gesture for controlling the electronic device 100 is not recognized within a predetermined time after the control right has been granted to the user, the controller 180 takes back the control right granted to the user.

The predetermined time may also be referred to as "control right retaining time," wherein if the control right retaining time passes without the user's gesture, the control right is lost by the controller 180.

According to an embodiment, the "predetermined time" may be set by the controller 180 differently based on the type of an application executable in the electronic device 100. Further, the controller 180 may also set the "predetermined time" differently based on the function performed by the application. Alternately, the controller 180 may also set the "predetermined time" differently based on whether a function associated with a predetermined function performed by the application is carried out.

Hereinafter, various examples where the control right retaining time is set differently will be described.

Figure 25:
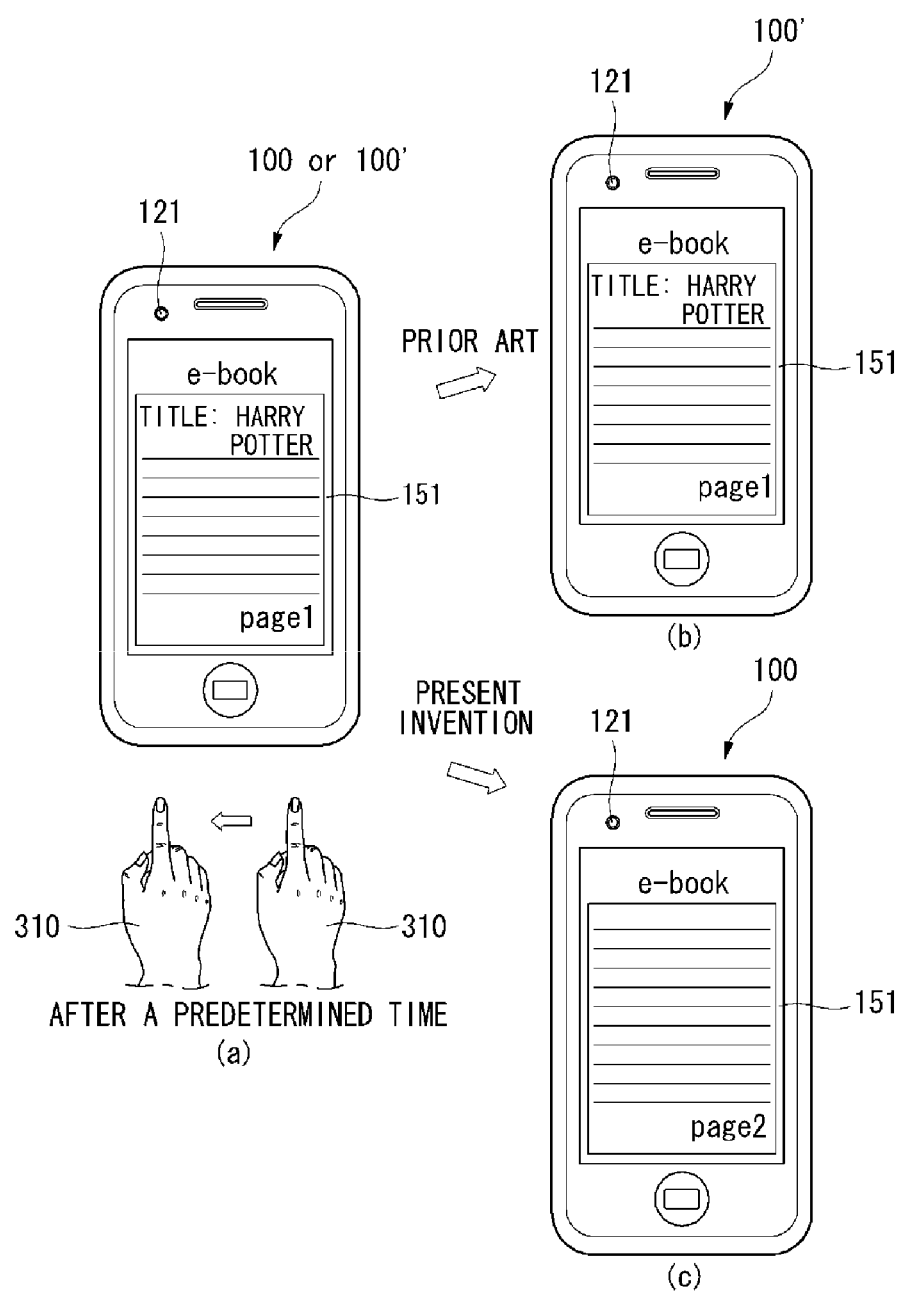
FIGS. 25 and 26 illustrate examples where the control right retaining time is set differently based on the type of an application executed in the electronic device 100.
Figure 26:
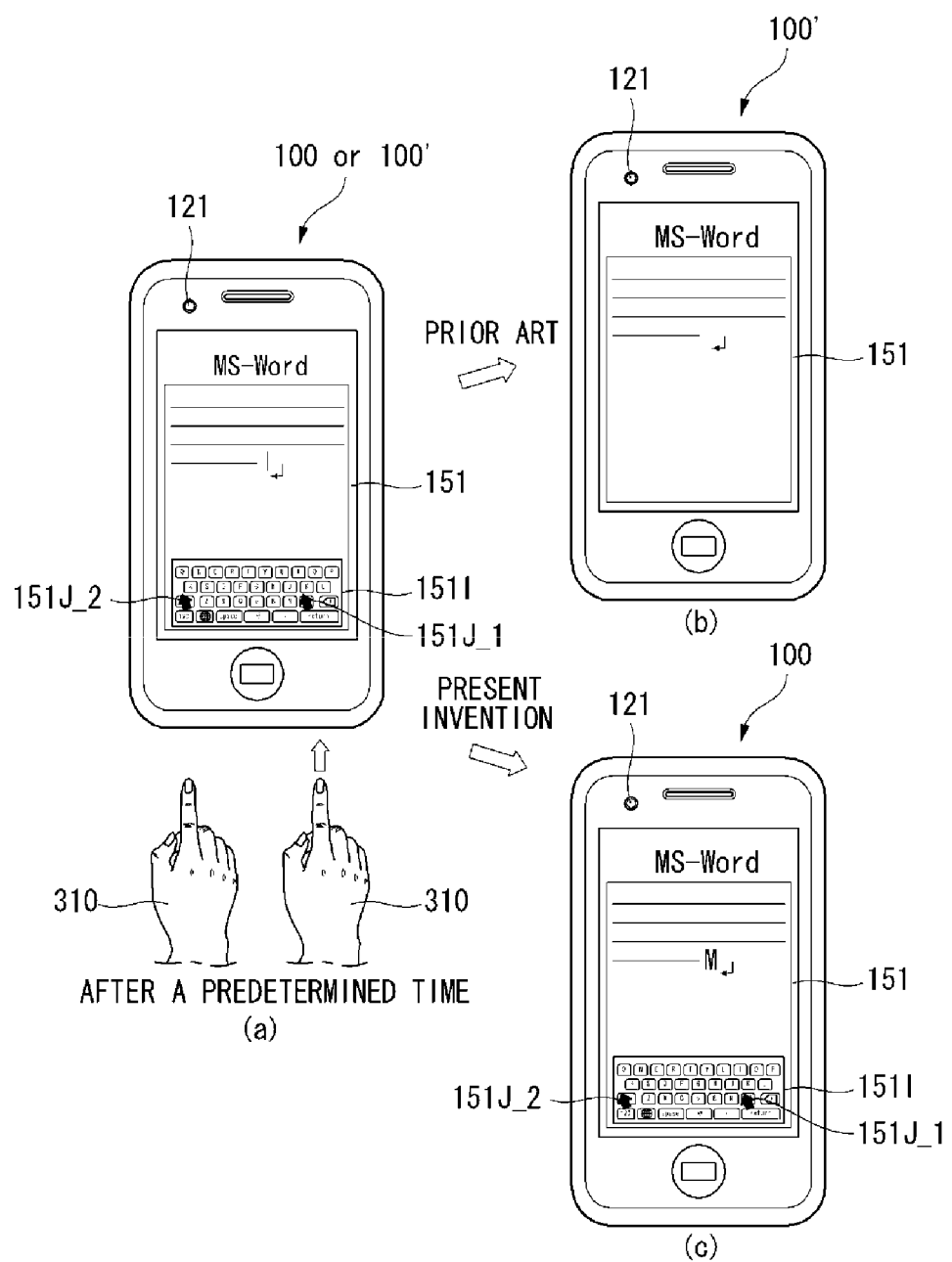

FIGS. 25 and 26 illustrate examples where the control right retaining time is set differently based on the type of an application executed in the electronic device 100. Specifically, FIG. 25 illustrates an example where the application being executed is an e-book application and FIG. 26 illustrates an example where the application being executed is a word processor application.

The control right retaining times for the e-book application and the word processor application may be set respectively considering a time taken the user to read the characters displayed on the display 151 and a time taken the user to think of an idea for writing.

Referring to (a) of FIG. 25, a user makes a gesture of turning pages by moving his right hand 310 to the left after a predetermined control right retaining time while an e-book application is in execution in the electronic device 100 or 100'.

Then, the conventional electronic device 100' does not display a next page on the display 151 despite the gesture as shown in (b) of FIG. 25. However, the electronic device 100 according to the embodiments displays a next page on the display 151 based on the gesture as shown in (c) of FIG. 25.

Referring to (a) of FIG. 26, a user makes a gesture of turning pages by moving his right hand 310 to select a character at which a cursor 151J_1 corresponding to the right hand 310 is located on a virtual keyboard 151I after a predetermined control right retaining time while a word processor application is in execution in the electronic device 100 or 100'.

Then, the conventional electronic device 100' does not display the inputted character on the execution screen of the word process application despite the gesture as shown in (b)

of FIG. 26, and deprives the user of the control right while deleting the virtual key board from the execution screen of the word processor application.

However, the electronic device 100 according to the embodiments displays a character "M" selected by the gesture on the execution screen of the word processor application based on the gesture as shown in (c) of FIG. 26. The electronic device 100 also displays cursors 151J_1 and 151J_2 respectively corresponding to the right and left hands 310 and the virtual key board 151I on the execution screen of the word processor application.

Figure 27:
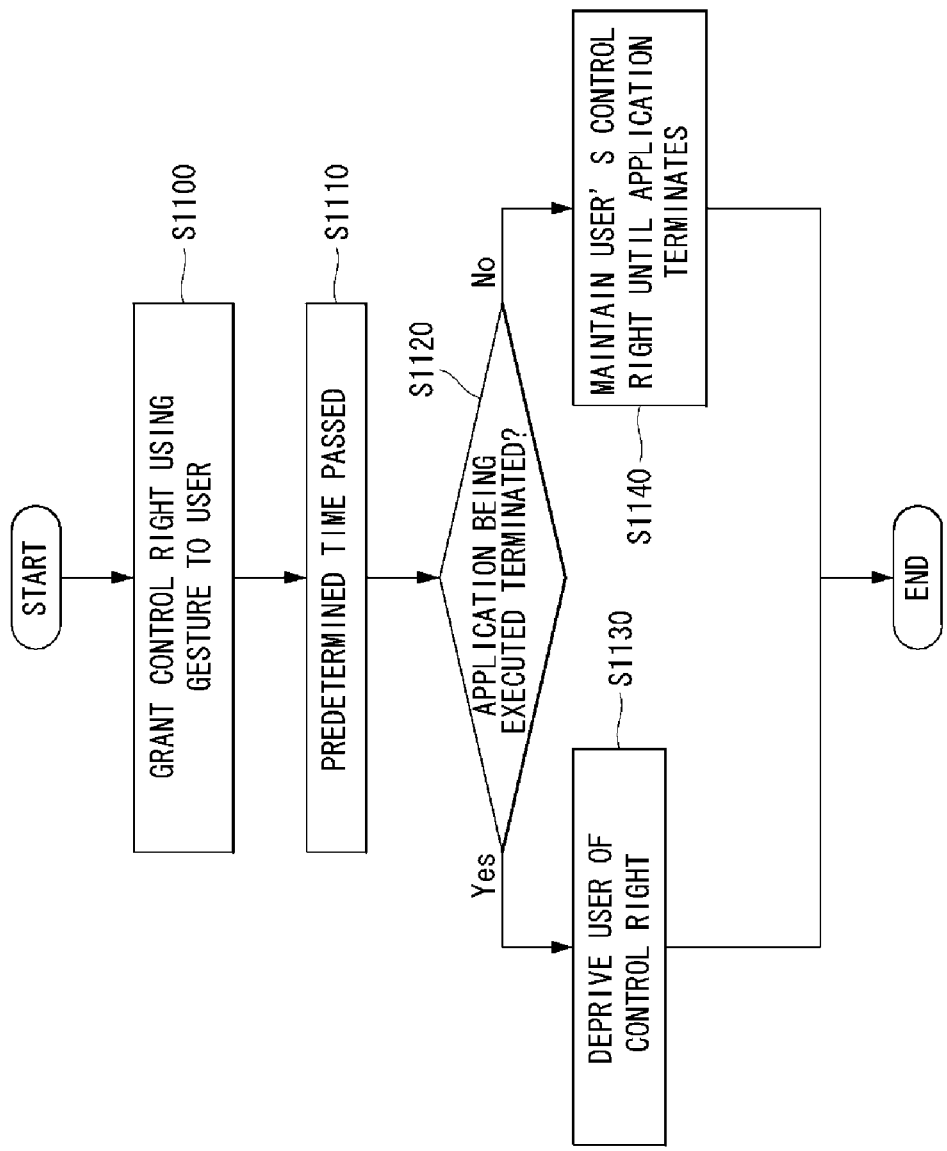
FIG. 27 is a flowchart illustrating a method of controlling whether to maintain a control right granted to a user based on whether an application being executed is terminated in a method of controlling an electronic device according to an embodiment.

FIG. 27 is a flowchart illustrating a method of controlling whether to maintain a control right granted to a user based on whether an application being executed is terminated in a method of controlling an electronic device according to an embodiment. The method of controlling an electronic device will now be described with reference to FIG. 27.

Upon recognizing a user's control right obtaining gesture, the controller 180 of the electronic device 100 grants the user a control right for the electronic device 100 so that the user can control the electronic device 100 using gestures (S1100). If a predetermined time elapses after the control right has been granted to the user without the user's control gesture (S1110), the controller 180 determines whether to terminate an application being executed (S1120).

If the application being executed is terminated, the controller 180 deprives the user of the control right (S1130). However, if the application being executed is still in execution, the controller 180 allows the user to retain the control right until the application is terminated (S1140). Thereafter, the controller 180 may newly calculate a predetermined control right retaining time during which the user may retain the control right after the application is terminated.

Figure 28:
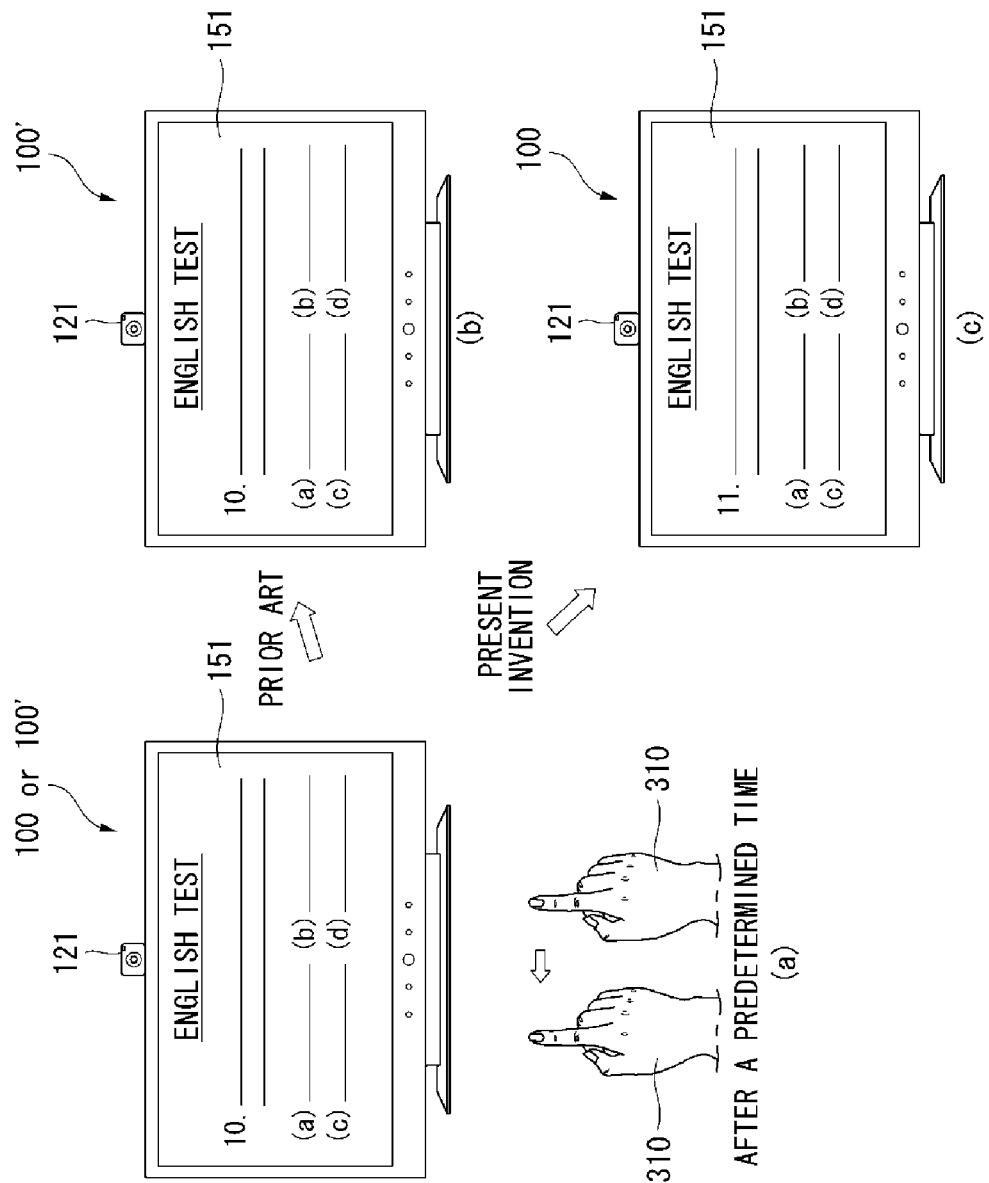
FIG. 28 illustrates an example where the method of controlling an electronic device as shown in FIG. 27 applies to an English test application which is in execution in the electronic device 100 according to the embodiments.

FIG. 28 illustrates an example where the method of controlling an electronic device as shown in FIG. 27 applies to an English test application which is in execution in the electronic device 100 according to the embodiments. A control right for the executing English test application shown in FIG. 28 is maintained until the English test application is terminated even if a predetermined time elapses without a control gesture.

According to embodiments, the "time of termination of the English test application" refers to when a test time predetermined in the English test application has been passed or when a user who solved all the questions included in the English test application terminates the English test application.

Referring to (a) of FIG. 28, a user makes a gesture of moving his right hand 310 to the left to display a next question on the screen without a control gesture within a predetermined control right retaining time while an English test application is in execution in the electronic device 100 or 100'.

Then, as shown in (b) of FIG. 28, the conventional electronic device 100' does not display the next question on the display 151 even through the gesture is recognized. However, the electronic device 100 according to the embodiments displays the next question on the display 151 based on the gesture as shown in (c) of FIG. 28.

Figure 29:
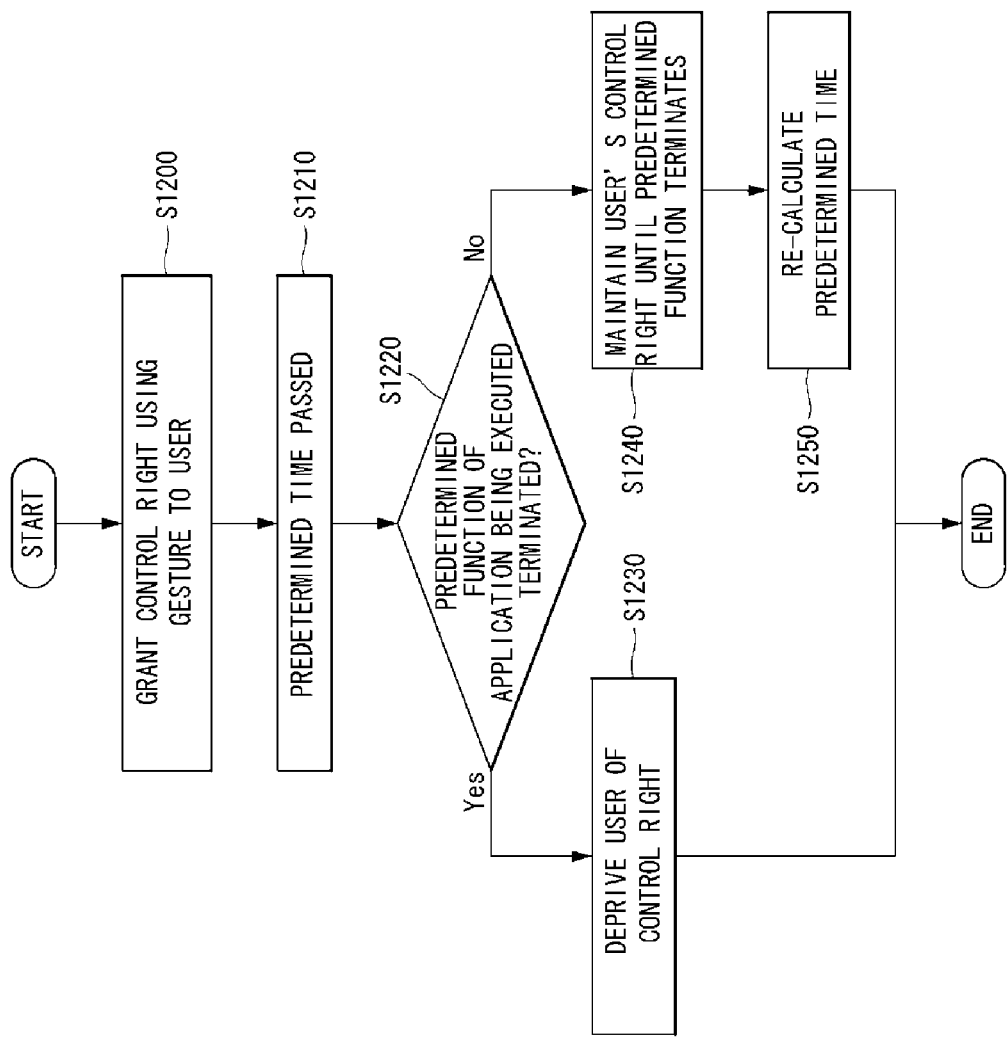
FIG. 29 is a flowchart illustrating a method of controlling whether a control right granted to a user is maintained based on whether a predetermined function of an application being executed is terminated in a method of controlling an electronic device according to an embodiment.

FIG. 29 is a flowchart illustrating a method of controlling whether a control right granted to a user is maintained based on whether a predetermined function of an application being executed is terminated in a method of controlling an electronic device according to an embodiment. The method of controlling an electronic device will now be described with reference to FIG. 29.

If a user's control right obtaining gesture is recognized, the controller 180 of the electronic device 100 grants the user a control right for the electronic device 100 that allows the user to control the electronic device 100 using gestures (S1200). If a predetermined time elapses after the control right has been granted to the user without the user's control gesture (S1210), the controller 180 determines whether a predetermined function of an application being executed is terminated (S1220).

If the predetermined function is terminated, the controller 180 deprives the user of the control right (S1230). However, if the application being executed is in execution, the controller 180 maintains the control right granted to the user until the predetermined function is terminated (S1240). Then, the controller 180 newly calculates a predetermined control right retaining time which serves as a reference time to take the control right back after the termination of the predetermined function (S1250).

Figure 30:
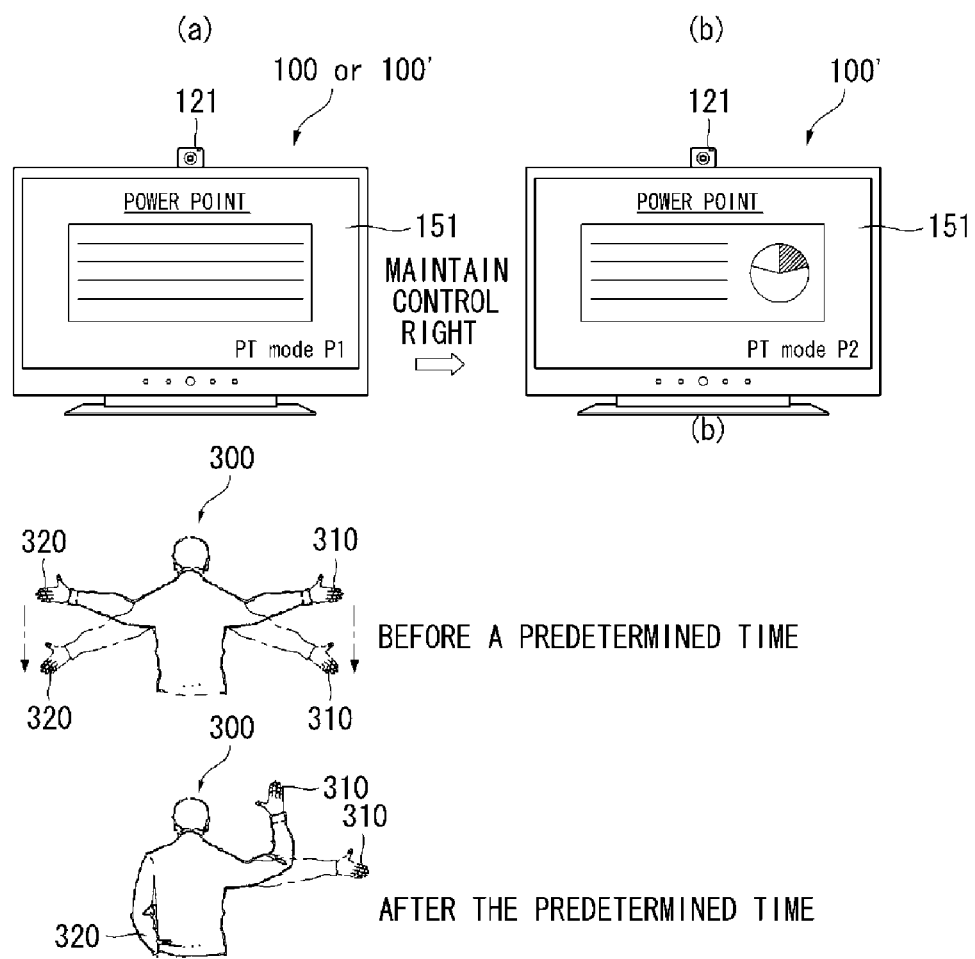
FIG. 30 illustrates an example where the method of controlling an electronic device described in connection with FIG. 29 applies to a presentation function of a presentation application (for example, Microsoft PowerPoint™ program) in execution in the electronic device 100.

FIG. 30 illustrates an example where the method of controlling an electronic device described in connection with FIG. 29 applies to a presentation function of a presentation application (for example, the Microsoft PowerPoint™ program) in execution in the electronic device 100. The control right in the presentation function of the executing presentation application shown in FIG. 30 is maintained until the presentation function is terminated even if a predetermined time elapses without a control gesture.

According to embodiments, the "time of termination of the presentation function" may refer to when a predetermined presentation time has elapsed or when the user 300 terminates the presentation function.

Referring to (a) of FIG. 30, the control right granted to the user 300 is maintained even if the user 300 makes a gesture of abandoning the control right, for example, by lowering his two hands 310 and 320 before a time predetermined in the electronic device 100 passes. For example, this is for purpose to ensure a smooth presentation by allowing the user 300 to maintain the control right even if the user 300 unintentionally makes a gesture of abandoning the control right during the presentation.

Referring to (a) of FIG. 30, the user makes a gesture of moving his right hand 310 to the right to display a next page on the screen without a control gesture within a predetermined control right retaining time while a presentation function of a presentation application is performed in the electronic device 100. Then, the electronic device 100 displays the next page on the display 151 based on the gesture as shown in (b) of FIG. 30.

Figure 31:
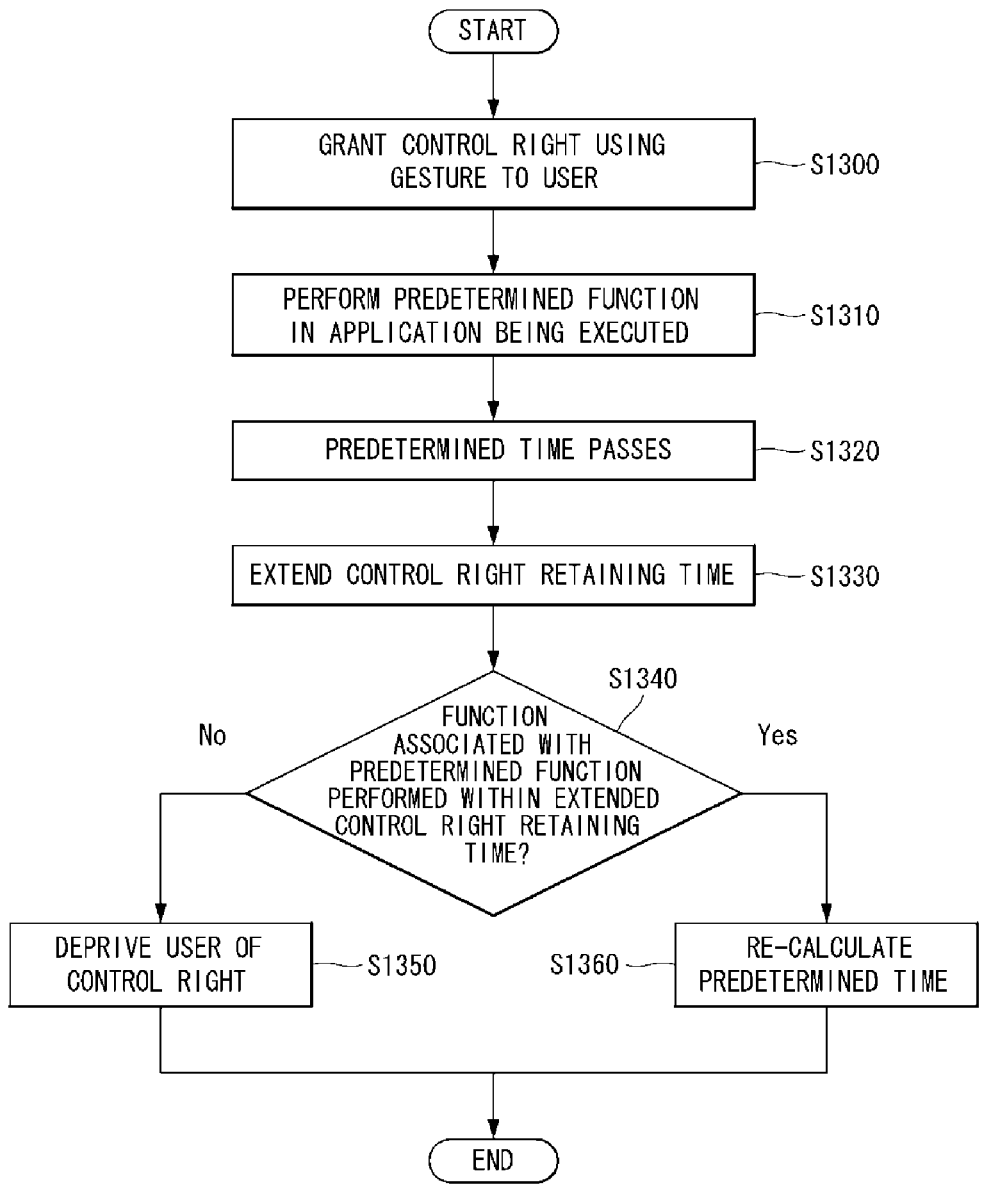
FIG. 31 is a flowchart illustrating a method of controlling a control right retaining time granted to a user based on whether a function associated with a specific function performed in an application being executed is conducted in a method of controlling an electronic device according to an embodiment.

FIG. 31 is a flowchart illustrating a method of controlling a control right retaining time granted to a user based on whether a function associated with a specific function performed in an application being executed is conducted in a method of controlling an electronic device according to an embodiment. The method of controlling an electronic device will now be described with reference to FIG. 31.

If a user's control right obtaining gesture is recognized, the controller 180 of the electronic device 100 grants the user a control right for the electronic device 100 to allow the user to control the electronic device 100 using gestures (S1300). Then, the controller 180 executes a predetermined application in response to the user's gesture and performs a predetermined function of the application being executed (S1310).

If a predetermined time goes by after the control right has been granted to the user without the user's control gesture after the predetermined function has been performed (S1320), the controller 180 extends a retaining time of the control right granted to the user by a predetermined time (S1330).

Thereafter, the controller 180 determines whether a function associated with the predetermined function is performed within the extended control right retaining time (S1340). If the function associated with the predetermined function is not performed within the extended control right retaining time, the controller 180 deprives the user of the control right (S1350).

However, if the function associated with the predetermined function is performed within the extended control right retaining time, the controller 180 newly calculates the predetermined time to determine whether to take back the control right granted to the user (S1360).

Figure 32:
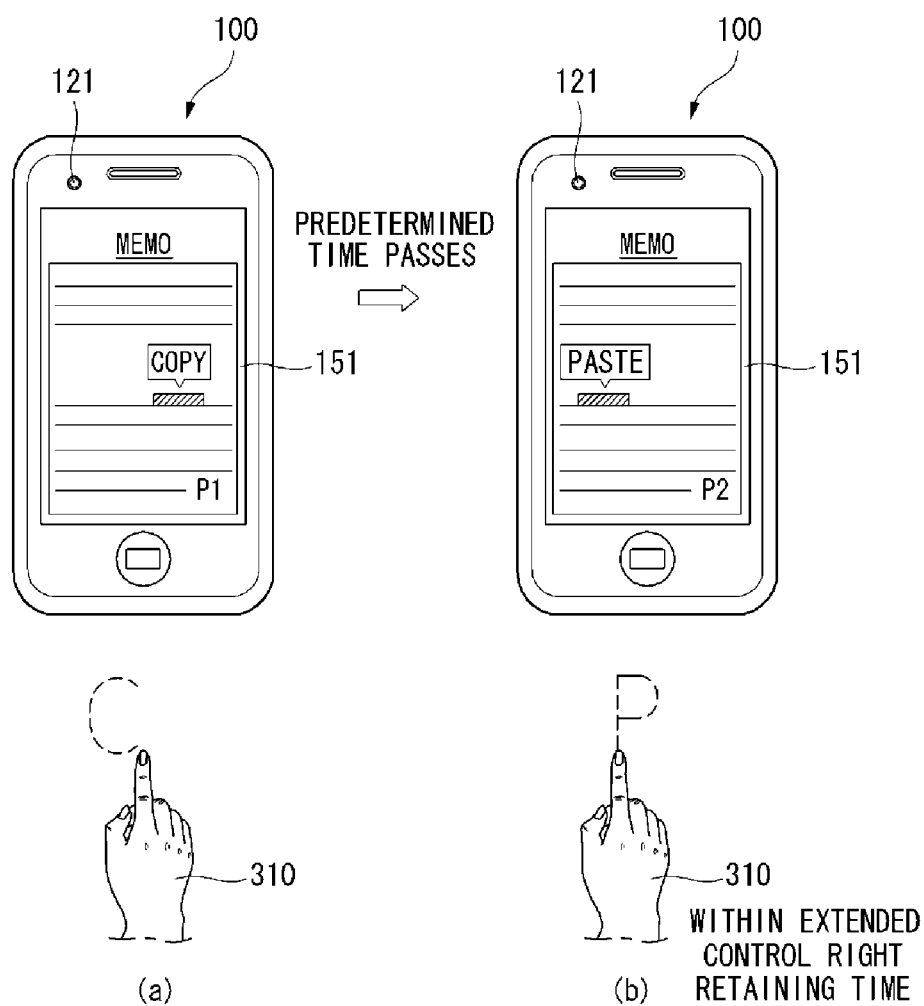
FIG. 32 illustrates an example where the method of controlling an electronic device described in connection with FIG. 31 applies to a note application in execution in the electronic device 100.

FIG. 32 illustrates an example where the method of controlling an electronic device described in connection with FIG. 31 applies to a note application in execution in the electronic device 100. The control right in the executing note application shown in FIG. 32 may be extended even if a predetermined time passes without a control gesture.

Referring to (a) of FIG. 32, a user makes a gesture of writing the letter "C" using his right hand 310 to copy specific text while the memo application is in execution in the electronic device 100. Then, if a predetermined time goes by, the controller 180 of the electronic device 100 extends the control right granted to the user by a predetermined time.

If the user makes a gesture of writing the letter "P" using his right hand 310 to paste the copied text within the extended control right retaining time after the predetermined time has passed, the controller 180 may paste the copied text at a specific position as shown in (b) of FIG. 32.

According to embodiments, the function associated with the predetermined function may include, but not limited to, selection and cut of text, and selection and copy of text, as well as copy and paste of text.

Figure 33:
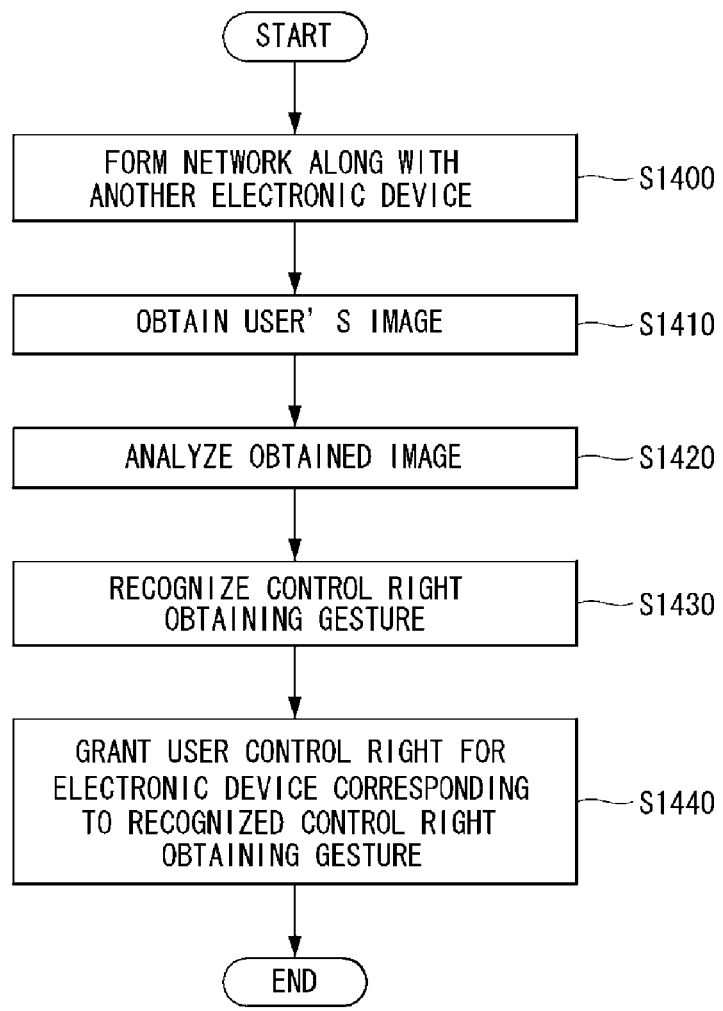
FIG. 33 is a flowchart illustrating a method of controlling an electronic device according to an embodiment.

FIG. 33 is a flowchart illustrating a method of controlling an electronic device according to an embodiment. Specifically, FIG. 33 illustrates an example of granting a control right for a plurality of electronic devices allowing a user to control the plurality of electronic devices using his gestures through the electronic device 100. The method of controlling an electronic device will now be described with reference to FIG. 33.

First, the electronic device 100 and another electronic device form a network (S1400). According to an embodiment, the network may be formed by various wired or wireless communication schemes. If the network is formed between the electronic device 100 and the other electronic device, the controller 180 of the electronic device 100 obtains a user's image by the camera 121 (S1410).

Next, the controller 180 analyzes the obtained image to determine whether there is a control right obtaining gesture corresponding to the obtained image among a plurality of control right obtaining gestures pre-stored in the memory 160. If among the plurality of control right obtaining gestures, a specific control right obtaining gesture is recognized (S1430), the controller 180 grants the user a control right for an electronic device corresponding to the recognized control right obtaining gesture (S1440).

Figure 34:
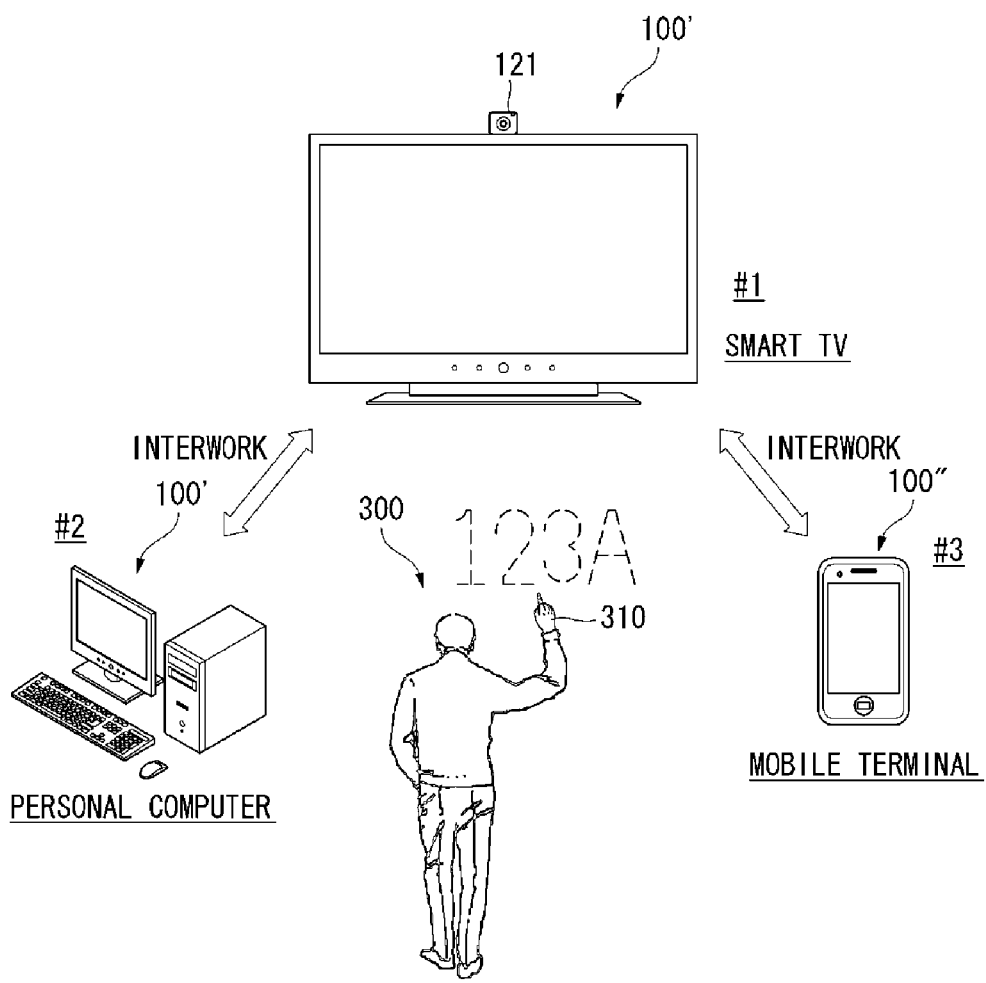
FIG. 34 illustrates an example where the user 300 obtains a control right for a plurality of electronic devices according to the method of controlling an electronic device as shown in FIG. 33.

FIG. 34 illustrates an example where the user 300 obtains a control right for a plurality of electronic devices according to the method of controlling an electronic device as shown in FIG. 33. Referring to FIG. 34, the electronic device 100 is a smart TV that interworks with other electronic devices, such as a personal computer 100' and a mobile terminal 100".

If the user 300 makes a gesture of writing "1" using his right hand 310, the controller 180 of the smart TV 100 grants the user 300 a control right for the smart TV 100. If the user 300 makes a gesture of writing "2" using his right hand 310, the controller 180 of the smart TV 100 grants the user 300 a control right for the personal computer 100' through the smart TV 100.

If the user 300 makes a gesture of writing "3" using his right hand 310, the controller 180 of the smart TV 100 grants the user 300 a control right for the mobile terminal 100" through the smart TV 100.

If the user 300 makes a gesture of writing the letter "A" using his right hand 310, the controller 180 of the smart TV 100 may grant the user 300 a control right for all of the smart TV 100, the personal computer 100', and the mobile terminal 100" through the smart TV 100.

For example, the controller 180 of the smart TV 100 may grant the user 300 a control right for at least one of the smart TV 100, the personal computer 100', and the mobile terminal 100" based on a control right obtaining operation of the user 300 recognized through the camera 121.

Figure 35:
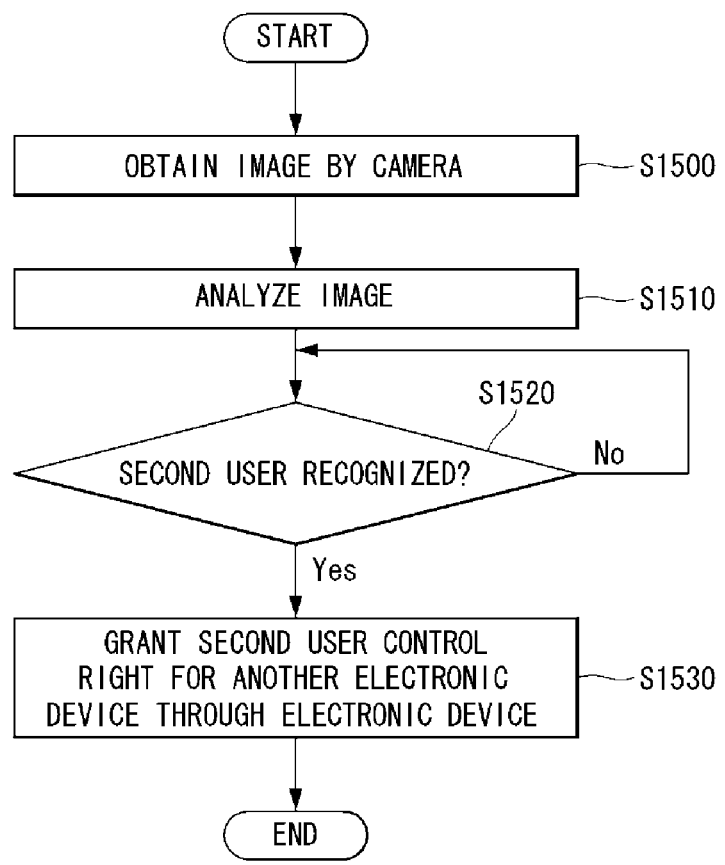
FIG. 35 is a flowchart illustrating a method of controlling an electronic device according to an embodiment.

FIG. 35 is a flowchart illustrating a method of controlling an electronic device according to an embodiment. Specifically, FIG. 35 illustrates an example of granting a control right for a another electronic device through the electronic device 100 to a user who has a control right for the another electronic device. The method of controlling an electronic device will now be described with reference to FIG. 35.

The controller 180 of the electronic device 100 obtains an image through the camera 121 (S1500) and analyzes the obtained image (S1510) to determine whether a user with a control right for the another electronic device (hereinafter, also referred to as a "second user") is recognized based on the obtained image (S1520). The "another electronic device" refers to an electronic device which interworks with the electronic device 100 through a predetermined network.

If the second user is recognized based on the obtained image, the controller 180 grants the second user a control right for the another electronic device so that the second user may control the another electronic device using his gestures through the electronic device 100 (S1530).

The controller 180 of the electronic device 100 may display control procedures, operation states, or operation screens of the another electronic device on the display 151.

Figure 36:
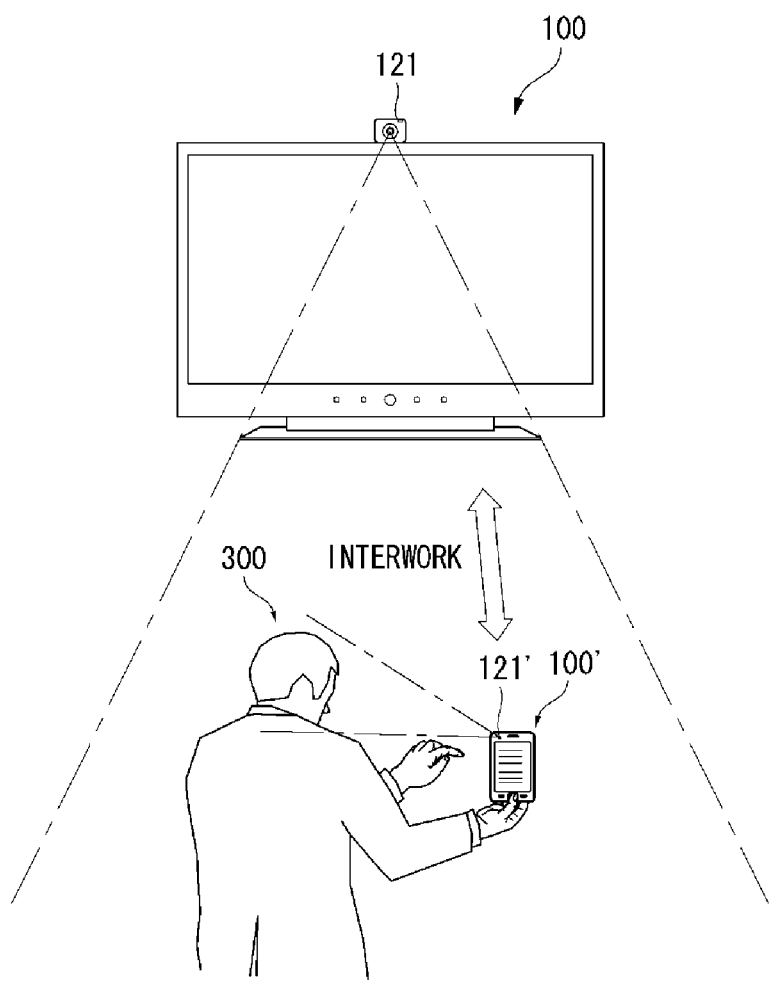
FIG. 36 illustrates an example where a control right for the another electronic device through the electronic device 100 is granted to a user who has a control right for the another electronic device (hereinafter, also referred to as a "second user") according to the method of controlling an electronic device described in connection with FIG. 35.

FIG. 36 illustrates an example where a control right for the another electronic device 100' through the electronic device 100 is granted to a user 300 who has a control right for the another electronic device 100' (hereinafter, also referred to as a "second user") according to the method of controlling an electronic device described in connection with FIG. 35.

Referring to FIG. 36, a controller (hereinafter, also referred to as a "second controller") of the another electronic device 100' recognizes the second user 300 through an image obtained by a camera 121' and maintains a control right of the second user 300. The controller 180 of the electronic device 100 may grant the second user 300 a control right for the another electronic device 100' through the electronic device 100 so that the second user may control the another electronic device 100' through the electronic device 100 using his gestures. For example, in the case that the electronic device 100 is a smart TV and the another electronic device 100' is a mobile terminal as shown in FIG. 36, the second user 300 may make use of phone functions of the mobile terminal 100' even through the smart TV 100.

Alternately, unlike those illustrated in FIGS. 35 and 36, the controller 180 of the electronic device 100 may also grant the user a control right for the another electronic device through the electronic device 100 if an image of a user who had a control right within a past predetermined time based on an image obtained by the camera 121. The "another electronic device" refers to an electronic device which interworked or currently interworks with the electronic device 100.

Figure 37:
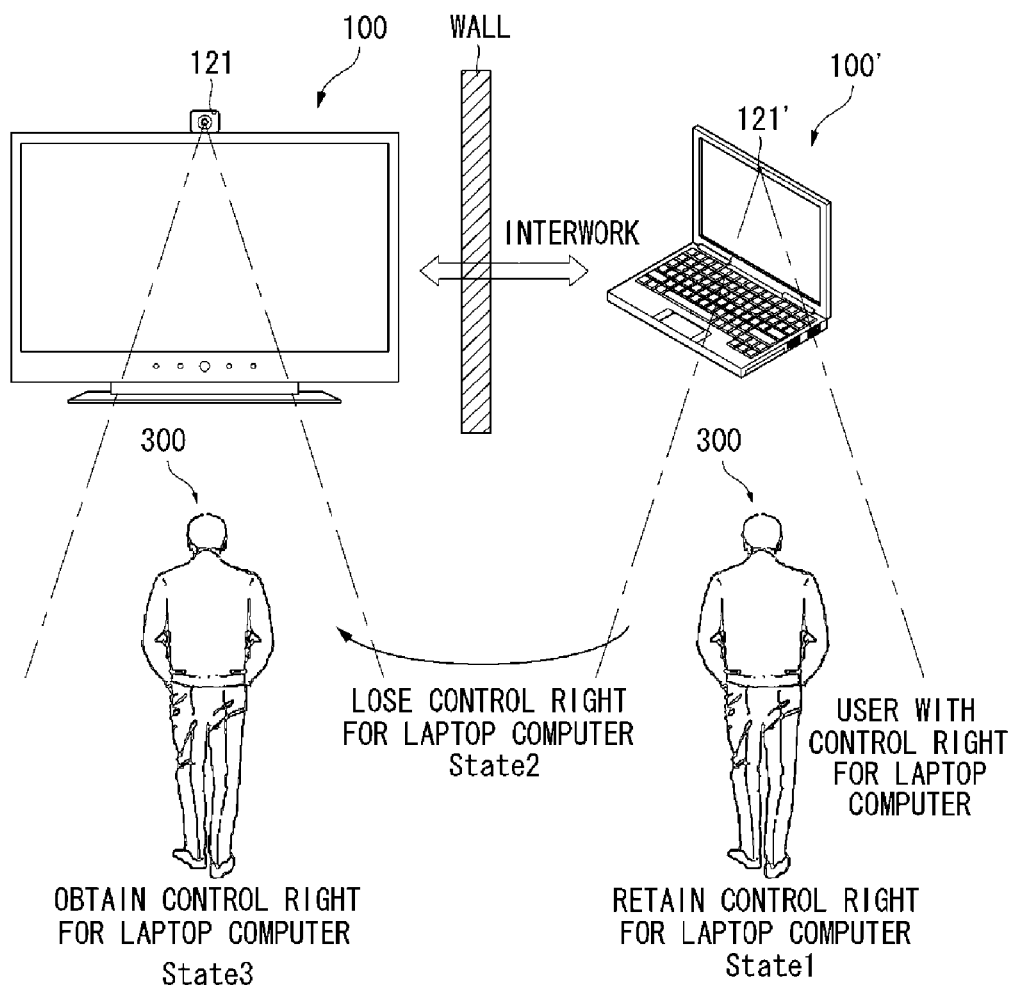
FIG. 37 illustrates an example where a control right for the another electronic device through the electronic device is granted to the second user who had a control right for the another electronic device.

FIG. 37 illustrates an example where a control right for the another electronic device 100' through the electronic device 100 is granted to the second user 300 who had a control right for the another electronic device 100'

Referring to FIG. 37, in a first state State 1, the user 300 is located within a range of recognition of a camera 121' included in a laptop computer 100' which is the another electronic device, and thus, the user 300 has a control right for the laptop computer. In a second state State 2, however, the user 300 moves to a place where the smart TV 100 is located departing from the recognition range of the camera 121', and thus, the user 300 loses the control right for the laptop computer 100'.

Next, if the user is positioned within a recognition range of the camera 121 of the smart TV 100—that is, the user is under a third state State 3, the user 300 may obtain a control right for the laptop computer 100' which is granted from the controller 180 of the smart TV 100 and allows the user 300 to control the laptop computer 100' through the smart TV 100.

Figure 38:
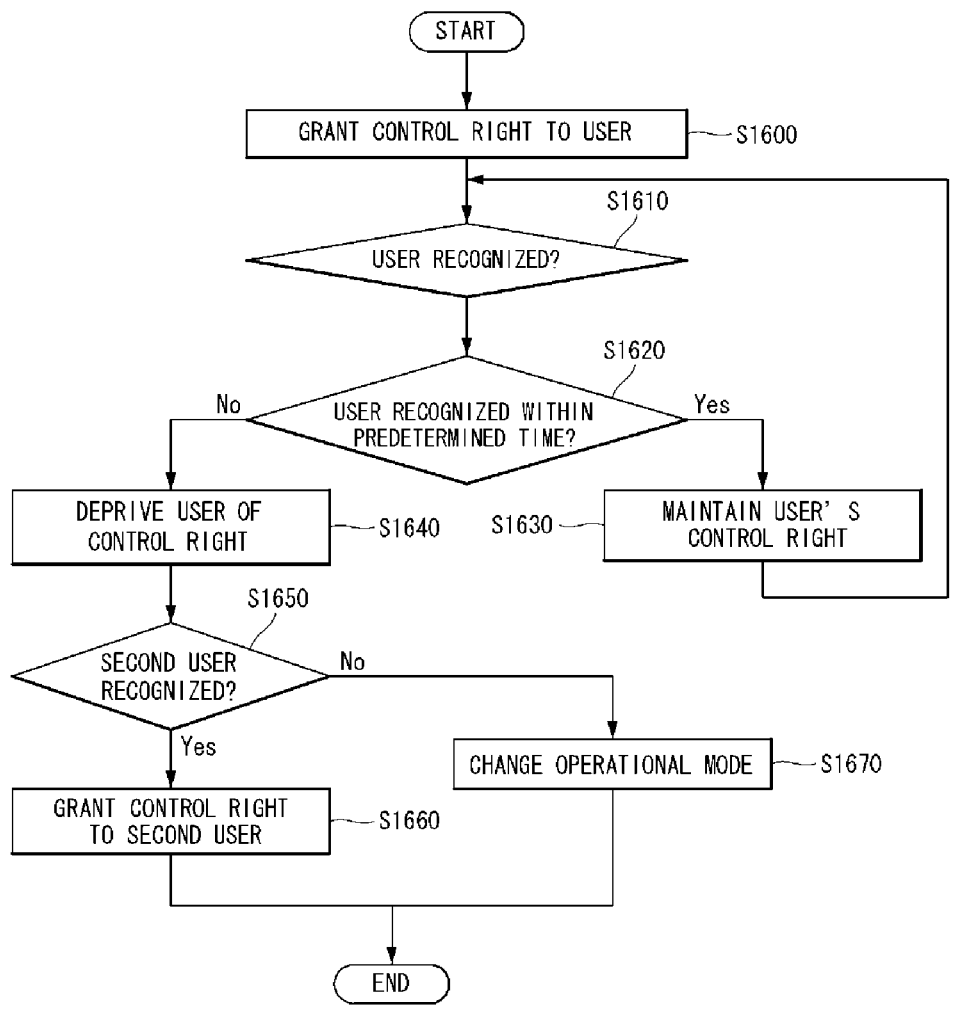
FIG. 38 is a flowchart illustrating a method of controlling an electronic device according to an embodiment.

FIG. 38 is a flowchart illustrating a method of controlling an electronic device according to an embodiment. Specifically, FIG. 38 illustrates a method of determining whether to maintain or take back a user's control right for the electronic device 100 according to the recognition through the camera 121 of the electronic device 100. The method of controlling an electronic device will now be described with reference to FIG. 38.

First, the controller 180 of the electronic device 100 grants a control right to a user who took a gesture for obtaining the control right so that the user may control the electronic device 100 using his gestures (S1600). Then, the controller 180 analyzes an image obtained by the camera 121 and determines whether the user is recognized within a recognition range of the camera 121 (S1610).

If the user is not recognized within the recognition range of the camera 121, the controller 180 determines whether the user is recognized again within the recognition range of the camera 121 within a predetermined time (S1620). If it is determined that the user is recognized, the controller 180 maintains the user's control right (S1630) and repeatedly performs the steps S1610 and S1620 to check if the user maintains the control right.

However, if the user is not recognized again within the recognition range of the camera 121 within a predetermined time after departing from the recognition range of the camera 121, the controller 180 deprives the user of the control right (S1640) and determines whether any other user (also referred to as a "second user") is recognized within the recognition range of the camera 121 (S1650).

If the user departs from the recognition range of the camera 121 and the second user is recognized within the recognition range of the camera 121, the controller 180 grants the second user a control right for the electronic device 100 (S1660). The second user may be preset as a user who is the second to get assigned with the control right for the electronic device 100 when the user with the control right is off the recognition range of the camera 121.

However, if the second user is not recognized within the recognition range of the camera 121 after the user departs from the recognition range of the camera 121, the controller 180 changes the operational mode of the electronic device 100 (S1670). According to an embodiment, the change of operational modes may include, but not limited to, a change from a normal operational mode to a power saving operational mode or a change from a normal operational mode to a power-off operational mode.

Although not shown in FIG. 38, according to an embodiment, the controller 180 of the electronic device 100 may deprive the user of the control right immediately after the user with the control right departs from the recognition range of the camera 121 and may grant the control right for the electronic device 100 to a second user who is recognized within the recognition range of the camera 121.

If the user is recognized again within the recognition range of the camera 121 within a predetermined time, the controller 180 may grant the control right back to the user. According to an embodiment, the control right granted to the second user may be deprived of or maintained.

Figure 39:
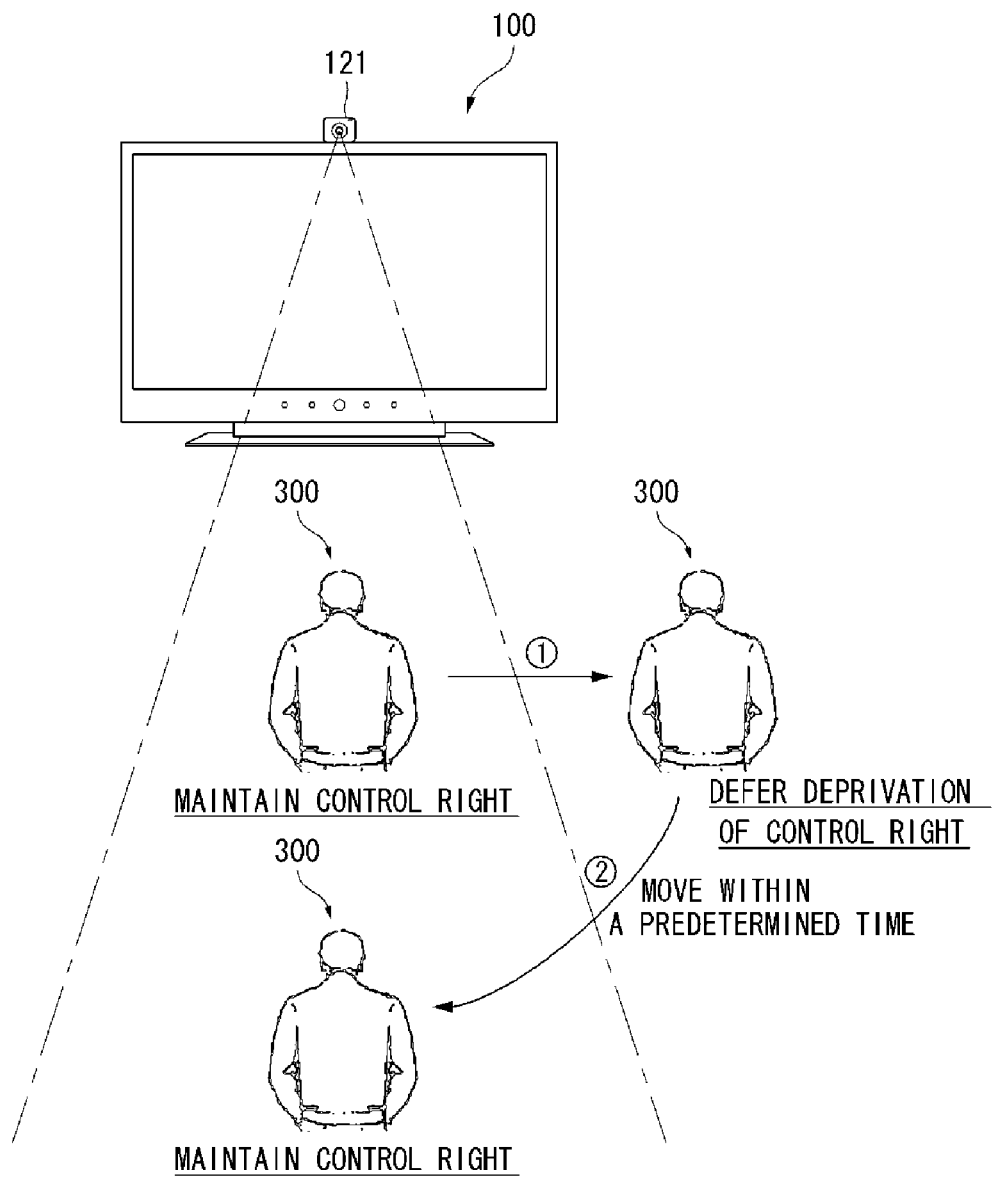
FIG. 39 illustrates an example where a control right granted to the user is maintained when the user 300 who departed from the recognition range of the camera 121 is recognized again within the recognition range of the camera 121 in a method of controlling an electronic device described in connection with FIG. 38.

FIG. 39 illustrates an example where a control right granted to the user 300 is maintained when the user 300 who departed from the recognition range of the camera 121 is recognized again within the recognition range of the camera 121 in a method of controlling an electronic device described in connection with FIG. 38.

Referring to FIG. 39, if the user 300 granted a control right is within the recognition range of the camera 121, the controller 180 of the electronic device 100 maintains the control right of the user 300.

Further, even if the user 300 departs from the recognition range of the camera 121, the controller 180 defers the deprivation of the control right granted to the user 300 for a predetermined time, and maintains the control right of the user 300 when the user 300 is located back within the recognition range of the camera 121 within the predetermined time. However, unless the user 300 is moved back within the recognition range of the camera 121 within the predetermined time, the controller 180 may deprive the user 300 of the control right.

Figure 40:
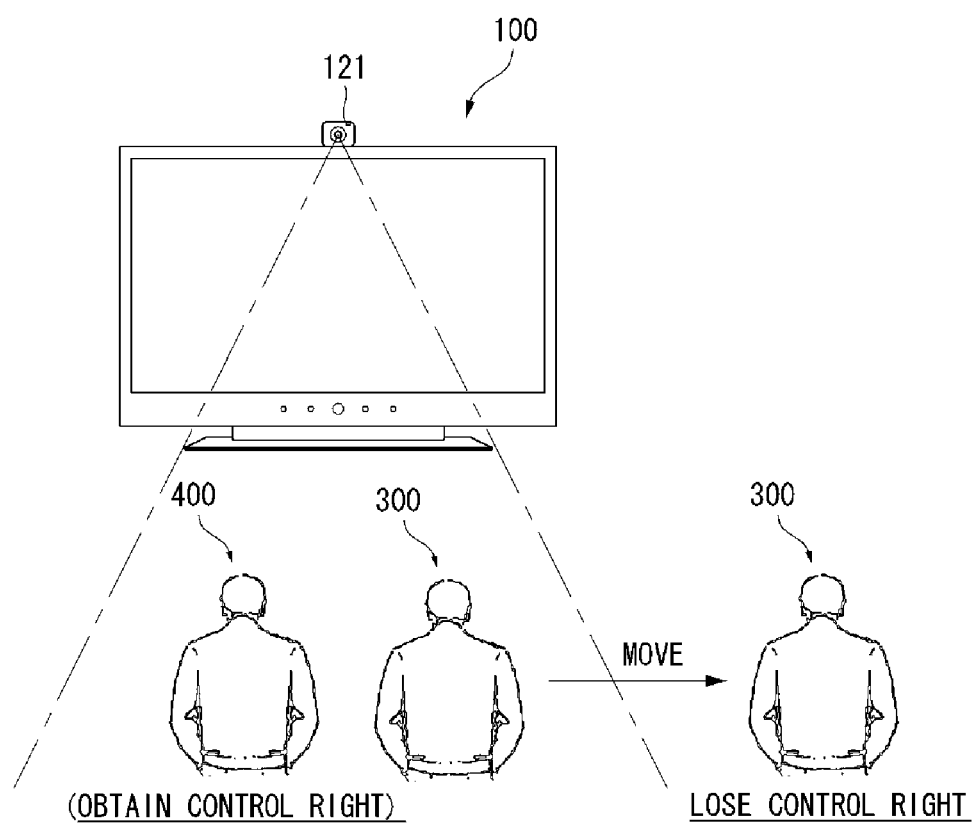
FIG. 40 illustrates an example where a user recognized through the camera 121 obtains a control right for the electronic device when a user with the control right for the electronic device departs from the recognition range of the camera.

FIG. 40 illustrates an example where a user 400 recognized through the camera 121 obtains a control right for the electronic device 100 when a user 300 with the control right for the electronic device 100 departs from the recognition range of the camera 121.

The above-described methods according to the embodiments may be implemented as programs that may executed by various computer means and recorded in a computer-readable medium. The computer-readable medium may contain a program command, a data file, and a data structure, alone or in a combination thereof. The program recorded in the medium may be one specially designed or configured for the embodiments or one known to those of ordinary skill in the art.

Examples of the computer-readable medium may include magnetic media, such as hard disks, floppy disks, or magnetic tapes, optical media, such as CD-ROMs or DVDs, magneto-optical media, such as floppy disks, ROMs, RAMs, flash memories, or other hardware devices that are configured to store and execute program commands. Examples of the program may include machine language codes such as those made by a compiler as well as high-class language codes executable by a computer using an interpreter. The above-listed hardware devices may be configured to operate as one or more software modules to perform the operations according to the embodiments, and vice versa.

The invention has been explained above with reference to example embodiments. It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

The invention claimed is:

1. An electronic device, comprising:
a camera configured to obtain an image; and
a controller configured to:
perform a control operation based on a control granting gesture recognized from the obtained image; and
perform a predetermined function of an application being executed when a predetermined gesture of a user is recognized, the user not having a control right, the predetermined gesture corresponding to the predetermined function, the predetermined gesture being different from the control granting gesture.

2. The electronic device of claim 1, wherein the controller is further configured to grant the user only a control right for the application being executed when the predetermined gesture is recognized.

3. The electronic device of claim 2, wherein the controller is further configured to grant the user only a control right for at least one function, including the predetermined function of the application being executed, when the predetermined gesture is recognized.

4. The electronic device of claim 2, wherein the controller is further configured to grant another user only a control right for the application being executed when the predetermined gesture of the user is recognized.

5. The electronic device of claim 1, wherein:
the application being executed comprises an application for controlling content received from another electronic device interworking with the electronic device; and
the user who does not have the control right is a user of the another electronic device.

6. The electronic device of claim 5, wherein the electronic device is further configured to receive the content through a near-field wireless communication network formed between the electronic device and the another electronic device.

7. The electronic device of claim 6, wherein the controller is further configured to:
obtain a location of the another electronic device using a wireless location determination method based on the near-field wireless communication network; and
obtain a location of a user who has a control right for the second control right based on the location of the another electronic device.

8. The electronic device of claim 1, wherein:
the application being executed is an application for performing a function associated with an external interrupt; and
the user who does not have the control right is a user associated with the external interrupt.

9. The electronic device of claim 8, wherein the controller is further configured to:
store information associated with the external interrupt if the user associated with the external interrupt is not recognized from the image; and
output the stored information if the user associated with the external interrupt is recognized.

10. The electronic device of claim 1, wherein:
the electronic device comprises a mobile terminal;
the application being executed is a phone application; and
the controller is further configured to obtain the user's image using the camera if the mobile terminal is away from the user's face during a call.

11. The electronic device of claim 10, wherein the controller is further configured to shift a call mode of the mobile terminal to a speaker phone mode if the mobile terminal is away from the user's face during a call.

12. The electronic device of claim 1, wherein the controller is further configured to display a virtual keyboard on an execution screen of the application when a gesture of the user for displaying the virtual keyboard on the execution screen of the application is recognized.

13. The electronic device of claim 1, wherein the controller is further configured to perform a character input using a virtual keyboard when a gesture of the user for entering a character using the virtual keyboard is recognized while the virtual keyboard is displayed on an execution screen of the application.

14. The electronic device of claim 1, wherein:
the application being executed comprises a driving application of the electronic device;
the driving application is in execution as a background process; and
the predetermined function comprises a function of changing an operational state of the electronic device based on the user's gesture.

15. The electronic device of claim 1, wherein:
the application being executed comprises a driving application of the electronic device;
the driving application is in execution as a background process; and
the predetermined function comprises a function of performing a predetermined function of a predetermined application corresponding to the user's gesture.

16. An electronic device, comprising:
a camera configured to obtain an image; and
a controller configured to:
grant a user a control right based on a gesture recognized from the obtained image; and
deprive the user of the control right if the user's control gesture is not recognized for a predetermined time, the controller further configured to differently set the predetermined time based on a type of an application.

17. The electronic device of claim 16, wherein the controller is further configured to differently set the predetermined time based on a function performed by the application.

18. The electronic device of claim 17, wherein the controller is further configured to differently set the predetermined time based on the user's setting.

19. The electronic device of claim 16, wherein the controller is further configured to differently set the predetermined time based on the user's setting.

20. The electronic device of claim 16, wherein the controller is further configured to maintain the control right granted to the user while a predetermined application is in execution even if a gesture of abandoning the control right is recognized.

21. The electronic device of claim 16, wherein the controller is further configured to maintain the control right granted to the user until an application being executed is terminated even if the user's control gesture is not recognized for the predetermined time.

22. The electronic device of claim 16, wherein the controller is further configured to maintain the control right granted to the user until a predetermined function of an application being executed is terminated even if the user's control gesture is not recognized for the predetermined time.

23. The electronic device of claim 16, wherein the controller is further configured to differently set or maintain the predetermined time based on whether a function associated with the performed predetermined function is conducted in the predetermined application.

24. An electronic device forming a network along with another electronic device, the electronic device comprising:

a camera configured to obtain an image; and a controller configured to grant a user a control right for the electronic device and the another electronic device such that the user controls the electronic device and the another electronic device, based on a gesture recognized from the obtained image.

25. The electronic device of claim 24, wherein the controller is further configured to grant the user a control right for the electronic device corresponding to a control right obtaining gesture recognized as an analysis result of the user's image among a plurality of predetermined control right obtaining gestures.

26. The electronic device of claim 24, wherein, when a second user who has a control right for the another electronic device is recognized from the obtained image, the controller is further configured to grant the second user a control right for the another electronic device allowing the second user to control the another electronic device through the electronic device.

27. The electronic device of claim 24, wherein, when a second user who previously had a control right for the another electronic device is recognized from the obtained image, the controller is further configured to grant the second user a control right for the another electronic device allowing the second user to control the another electronic device through the electronic device.

28. An electronic device, comprising:

a camera configured to obtain an image; and a controller configured to:
  grant a user a control right for the electronic device such that the user controls the electronic device, based on a gesture recognized from the obtained image; and
  deprive the user of the control right if the user departs from a recognition range of the camera, the controller maintaining the control right granted to the user for at least a predetermined time after the user departs from the recognition range of the camera.

29. The electronic device of claim 28, wherein the controller is further configured to grant a second user recognized through the camera a control right allowing the second user to control the electronic device using a gesture when the user departs from the recognition range of the camera.

30. The electronic device of claim 29, wherein the second user is a user preset as a user who is the second to have a control right for the electronic device.

31. The electronic device of claim 29, wherein the controller is further configured to change an operational mode of the electronic device if the second user is not recognized when the user departs from the recognition range of the camera.

32. An electronic device, comprising:

a camera configured to obtain an image; and a controller configured to:
  perform a control operation based on a control granting gesture recognized from the obtained image, the control operation granting a control right to a first user; and
  perform a predetermined function of an application being executed when a predetermined gesture of a second user, different from the first user, is recognized, where only the first user has the control right, the predetermined gesture corresponding to the predetermined function, the predetermined gesture being different from the control granting gesture.

* * * * *